(12) United States Patent
Meredith et al.

(10) Patent No.: US 7,409,671 B1
(45) Date of Patent: Aug. 5, 2008

(54) MODEL FOR BUSINESS WORKFLOW PROCESSES

(75) Inventors: Lucius Gregory Meredith, Seattle, WA (US); Amit Mital, Kirkland, WA (US); Marc Levy, Woodinville, WA (US); Brian Beckman, Newcastle, WA (US); Anthony Andrews, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/560,373

(22) Filed: Apr. 28, 2000

(51) Int. Cl.
*G06F 9/44* (2006.01)
*G06F 11/00* (2006.01)
*G06F 9/46* (2006.01)

(52) U.S. Cl. .................... 717/104; 717/102; 714/15; 718/101

(58) Field of Classification Search .............. 717/102, 717/103, 106, 107, 117, 104; 707/202; 714/1, 714/2, 3, 15, 16; 718/101
See application file for complete search history.

(56) References Cited

U.S. PATENT DOCUMENTS

| | | | |
|---|---|---|---|
| 5,261,069 A | 11/1993 | Wilkinson et al. | |
| 5,524,241 A | 6/1996 | Ghoneimy et al. | |
| 5,581,691 A | 12/1996 | Hsu et al. | |
| 5,630,069 A | 5/1997 | Flores et al. | |
| 5,706,429 A | 1/1998 | Lai et al. | |
| 5,745,687 A * | 4/1998 | Randell | 709/201 |
| 5,768,506 A * | 6/1998 | Randell | 709/202 |
| 5,774,661 A * | 6/1998 | Chatterjee et al. | 709/203 |
| 5,815,152 A * | 9/1998 | Collier et al. | 345/839 |
| 5,918,218 A | 6/1999 | Harris et al. | |
| 5,930,512 A * | 7/1999 | Boden et al. | 717/102 |
| 5,940,839 A | 8/1999 | Chen et al. | |
| 5,960,420 A | 9/1999 | Leymann et al. | |
| 6,009,405 A | 12/1999 | Leymann et al. | |
| 6,119,149 A * | 9/2000 | Notani | 709/205 |
| 6,225,998 B1 * | 5/2001 | Okita et al. | 345/853 |
| 6,337,901 B1 * | 1/2002 | Rome et al. | 379/112.01 |
| 6,393,456 B1 * | 5/2002 | Ambler et al. | 709/200 |
| 6,397,192 B1 * | 5/2002 | Notani et al. | 705/9 |

(Continued)

OTHER PUBLICATIONS

"Using the WFT Development Environment," 1998, Template Software, pp. i-xviii, Ch. 1: pp. 1-5, Ch. 2: pp. 1-2, Ch. 3: pp. 1-34, Ch. 6: pp. 1-2.*

(Continued)

*Primary Examiner*—Eric B Kiss
(74) *Attorney, Agent, or Firm*—Amin, Turocy & Calvin, LLP

(57) ABSTRACT

A methodology of reducing process algebra to a language that facilitates modeling a business workflow process is provided. A process algebra is reduced to a model for business workflow processes. The model is then reduced to a scheduling programming language to allow users to create models of business process by selecting between features of the model and conventional modeling features. The scheduling programming language can be represented as a graphical user interface program that is convertible to a schedule language written in a programmable language. The present invention provides for explicitly representing parallelism within the business workflow process by separating interdependent transactions from independent transactions. The isolation of certain transactions are relaxed, such that users can define transactional boundaries in order to increase granularity of the transaction at an action level and provide visibility of transactions at intermediate steps.

28 Claims, 32 Drawing Sheets

U.S. PATENT DOCUMENTS

| | | | |
|---|---|---|---|
| 6,516,322 B1 * | 2/2003 | Meredith | 707/102 |
| 6,968,503 B1 * | 11/2005 | Chang et al. | 715/526 |
| 2002/0019797 A1 * | 2/2002 | Stewart et al. | 705/37 |

OTHER PUBLICATIONS

David Hollingsworth, "Workflow Management Coalition The Workflow Reference Model," Jan. 19, 1995, The Workflow Management Coalition, Document No. TC00-1003, pp. 1-55.*

"Workflow Management Coalition Workflow Standard—Interoperability Wf-XML Binding," Jan. 11, 2000, Workflow Management Coalition, Doc. No. WFMC-TC-1023, 40 pages.*

"XML based Process Management Standard launched by Workflow Management Coalition—'Wf-XML'," Jul. 7, 1999 [online], accessed Jan. 3, 2006, Workflow Management Coalition, <URL: http://www.wfmc.org/pr/pr1999-07-07.pdf>, 4 pages.*

"Developing a WFT Workflow System," 1998, Template Software, pp. "4-1" through "4-24", "5-1" through "5-41".*

* cited by examiner

COMBINATORS SYNTAX $P ::= 0 \mid \alpha\alpha.P \mid P^{\perp} \mid P \otimes P \mid Cut(P,P,P) \mid !P \mid (let(x,y)P)$ $\alpha ::= \tau \mid x \mid x \mid \alpha \otimes \alpha$

STRUCTURAL EQUIVALENCE

1. $\alpha_1\alpha_2.(let(x,y)P = (let(x,y)\alpha_1\alpha_2.P)$

2. $(let(u,v)let(x,y)P)) = (let(x,y)(let(u,v)P))$

3. $(let(u,v)P) \otimes let(x,y)Q = (let(u \otimes x, v \otimes y)P \otimes Q)$

4. $(\alpha_1\alpha_2.P) \otimes (\beta_1\beta_2.Q) = (\alpha_1 \otimes \beta_1)(\alpha_2 \otimes \beta_2).P \otimes Q$ 5. $(\alpha_1\alpha_2.P) = (\alpha_1 \otimes \beta_1(\alpha_2 \otimes \tau).P \; . \; \beta \in G(P)$ 6. $0 \otimes 0 = 0$ 7. $!P = P \otimes !P$

Fig. 1d

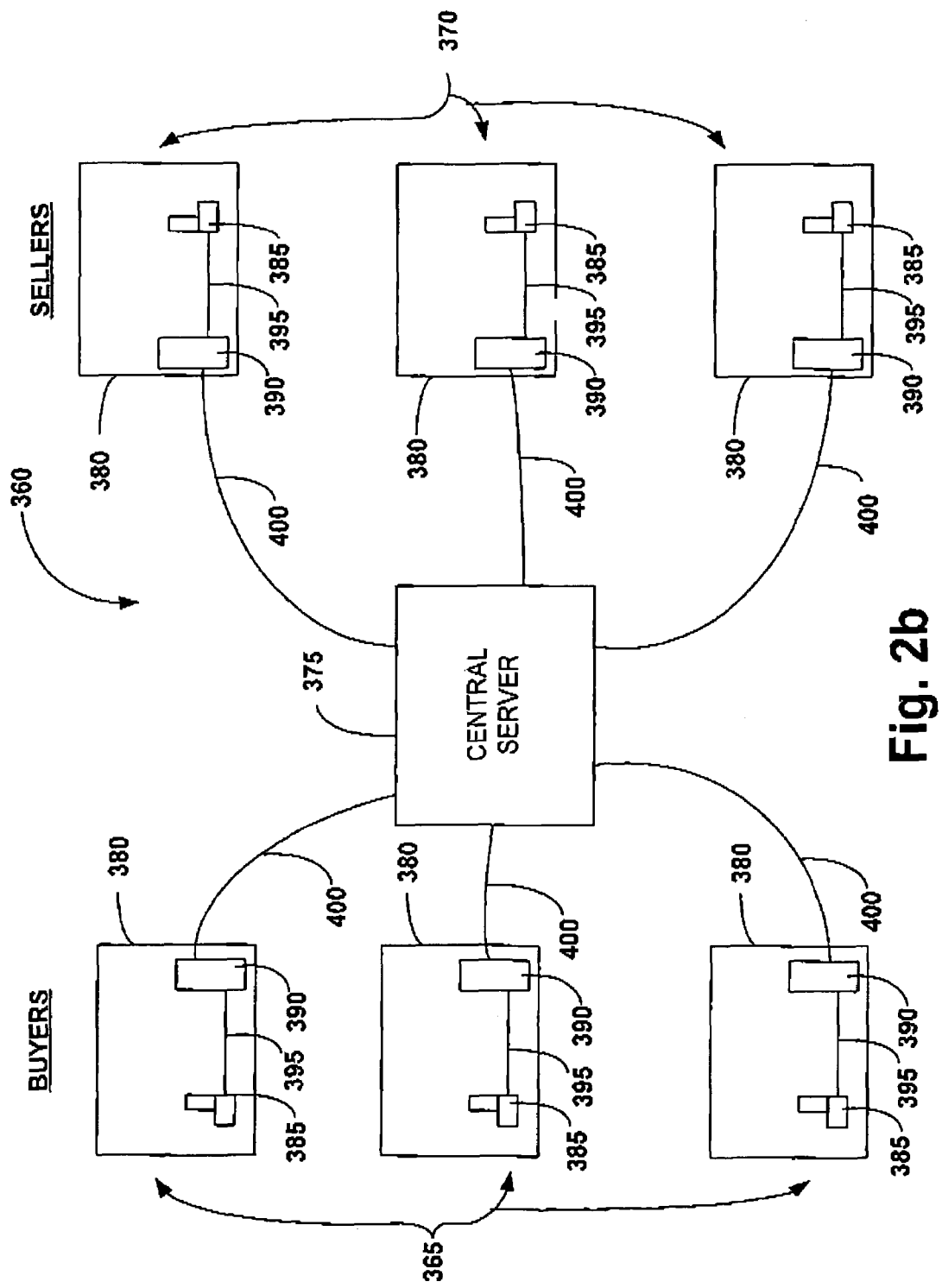

| SLANG | | |
|---|---|---|
| schedule | : : = | header? process? contextRef? |
| header | : : = | portList? messageList? contextList? |
| process | : : = | zero \| sequence \| switch \| map \| copy\| partition \| connect \| cut |
| portList | : : = | port* |
| messageList | : : = | message* |
| contextList | : : = | context* |
| zero | : : = | zero |
| sequence | : : = | genericAction* process? contextRef? |
| genericAction | : : = | silence \| action \| task \| call \| return \| release |
| silence | : : = | silence |
| action | : : = | source \| sink |
| source | : : = | portRef messageRef contextRef? |
| sink | : : = | portRef messageRef contextRerf? |
| task | : : = | action* contextRef? |
| call | : : = | schedRef portRef* messageRef* contextRef? |
| switch | : : = | branch* (default process) ? contextRef? |
| branch | : : = | case process |
| case | : : = | ruleRef msgRef msgRef |
| map | : : = | process assignmentList? contextRef? |
| assignmentList | : : = | asignment* |
| assignment | : : = | messageRef portRef |
| copy | : : = | process contextRef? |
| partition | : : = | process* contextRef? |
| connect | : : = | process process connectionList contextRef? |
| connectionList | : : = | connection* |
| connection | : : = | portRef portRef |
| cut | : : = | process process process contextRef? |

Fig. 6

| Schedule (EBNF) | | |
|---|---|---|
| schedule | ::= | *schedule* name identity header process contextRef? |
| name | ::= | *name* identifier |
| identity | ::= | *guid* GUID |
| header | ::= | portList messageList contextList? |
| portList | ::= | *portList* port* |
| messageList | ::= | *messageList* message* |
| contextList | ::= | *contextList* context* |
| scheduleRef | ::= | *scheduleRef* URI |

Fig. 7a

```
Schedule (XML)
<!ELEMENT schedule (header?, (zero | sequence | switch | map
   | copy | partition | connect | cut) ?, contextRef?)>
<!ATTLIST schedule
   name      ID       #IMPLIED
   guid      CDATA    #IMPLIED>

<!ELEMENT scheduleRef EMPTY>
<!ATTLIST scheculeRef
   location CDATA #REQUIRED>

<!ELEMENT header (portList?, messageList?, contextList?)>

<!ELEMENT portList (port*)>

<!ELEMENT messageList (message*)>

<!ELEMENT contextList (context*)>
```

Fig. 7b

| Example |
|---|
| `<schedule name="mySchedule">`<br>`<header>`<br>   `<portList>`<br>      `<port name="p0">`<br>      `<port name="p1">`<br>   `</portList>`<br>   `<messageList>`<br>      `<message name="m0"/>`<br>      `<message name="m1"/>`<br>   `</messageList>`<br>`</header>`<br>`<!-- The schedule body goes here -->`<br>`</schedule>` |

Fig. 7c

| Port (EBNF) | |
|---|---|
| port | ::= *port portName* |
| portName | ::= *identifier* |
| portRef | ::= *portRef URI* |

Fig. 8a

| Port (XML) |
|---|
| `<!ELEMENT port EMPTY>`<br>`<!ATTLIST   port`<br>   `name          ID    #REQUIRED>`<br><br>`<!ELEMENT portRef EMPTY>`<br>`<!ATTLIST   portREF`<br>  `location CDATA #REQUIRED>` |

Fig. 8b

| Message (EBNF) | |
|---|---|
| message | ::= *message messageName* |
| messageName | ::= *identifier* |
| messageRef | ::= *messageRef URI* |

Fig. 9a

| Message (XML) |
|---|
| <!ELEMENT message EMPTY> <br> <!ATTLIST message <br>   name     ID     #REQUIRED> <br><br> <!ELEMENT messageRef EMPTY> <br> <!ATTLIST messageRef <br>   location  CDATA  #REQUIRED> |

Fig. 9b

| Context (EBNF) | |
|---|---|
| context | ::= *context* contextName transactional? compensated? errorCondition? |
| contextName | ::= *identifier* |
| transactional | ::= *transactional* |
| compensated | ::= *compensated* process? |
| error Condition | ::= *ruleRef messageRef* |

Fig. 10a

| Context (XML) |
|---|
| <!ELEMENT context (transactional?)> <br> <!ATTLIST context <br>   name      ID     #REQUIRED> <br><br> <!ELEMENT transactional (zero \| sequence \| switch \| map \| copy \| partition \| connect \| cut) ?> <br><br> <!ELEMENT contextRef EMPTY> <br> <!ATTLIST contextRef <br>   location    CDATA  #REQUIRED> |

Fig. 10b

| Action (EBNF) | |
|---|---|
| action | ::= source sink |
| source | ::= *source* portRef messageRef contextRef? |
| sink | ::= *sink* portRef messageRef contextRef? |

| Action (XML) |  |
|---|---|
| <!ELEMENT sink | (portRef, messageRef, contextRef?)> |
| <!ELEMENT source | (portRef, messageRef, contextRef?)> |

| Process | |
|---|---|
| process | ::= zero \| sequence \| switch \| map \| copy \| partition \| connect \| cut |

| Zero (EBNF) |
|---|
| zero  ::=  zero |

Fig. 13a

| Zero (XML) |
|---|
| <!ELEMENT zero EMPTY> |

Fig. 13b

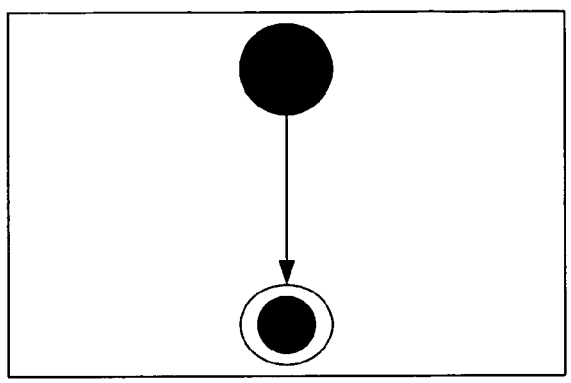

Fig. 13c

| Sequence (EBNF) | |
|---|---|
| sequence | ::= genericAction+ process? contextRef? |
| genericAction | ::= silence \| action \| task \| call \| return<br>\| relese |

Fig. 14a

| Sequence (XML) |
|---|
| <!ELEMENT sequence ( (silence \| sink \| source \| task \| call \|<br>   return \| release)*, (zero \| sequence \| switch \| map \| copy \|<br>   partition \| connect \| cut) ? )><br><!ATTLIST   sequence<br>   ctxt         IDREF  #IMPLIED> |

Fig. 14b

| Example |
|---|
| \<sequence\><br>  \<sink\><br>    \<portRef location="p0"/\><br>    \<messageRef location="m0"/\><br>  \</sink\><br>  \<source\><br>    \<portRef location="p1"/\><br>    \<messageREf location="m1"/\><br>  \</source\><br>\</sequence\> |

| Silence (EBNF) |
|---|
| silence  : : = *zero* |

| Silence (XML) |
|---|
| \<!ELEMENT silence EMPTY\> |

```
Task (EBNF)
task      ::= action* choice? ctxtRef?
choice    ::= all | any
```

```
Task (XML)
<!ELEMENT task ( ( sink | source)*, contextRef?)>
<!ATTLIST  task
   choice (all / any) "all")
```

```
Example
<task>
   <source>
      <portRef location="p0"/>
      <messageRef location="m0"/>
   </source>
   <source>
      <portRef location="p1"/>
      <message location="m1"/>
   </source>
</task>
```

| Call (EBNF) |
|---|
| call ::= schedRef portRef* messageRef* contextTef? |

Fig. 17a

| Call (XML) |
|---|
| <!ELEMENT call (scheduleRef, portRef*, messageRef*, contextRef)> |

Fig. 17b

| Return (EBNF) |
|---|
| return ::= *return* contextRef? |

Fig. 18a

| Return (XML) |
|---|
| <!ELEMENT return (contextRef?)> |

Fig. 18b

| Release (EBNF) |
|---|
| release ::= release contextRef? |

Fig. 19a

| Release (XML) |
|---|
| <!ELEMENT release (contextRef?)> |

Fig. 19b

| Switch (EBNF) | |
|---|---|
| switch | ::= branch* default? contextRef? |
| branch | ::= case process contextRef? |
| case | ::= *case* ruleRef messageRef messageRef |
| ruleRef | ::= *ruleRef URI* |
| default | ::= *default* process |

Fig. 20a

| Switch (XML) |
|---|
| <!ELEMENT switch (branch* default? contextRef?)> <br><br> <!ELEMENT branch (case, (zero \| sequence \| switch \| map \| copy \| partition \| connect \| cut), contextRef?)> <br><br> <!ELEMENT case (ruleRef, messageRef, messageRef)> <br><br> <!ELEMENT ruleRef EMPTY> <br> <!ATTLIST ruleRef <br> location CDATA #REQUIRED> <br><br> <!ELEMENT default (zero \| sequence \| switch \| map \| copy \| partition \| connect \| cut), contextRef?)> |

Fig. 20b

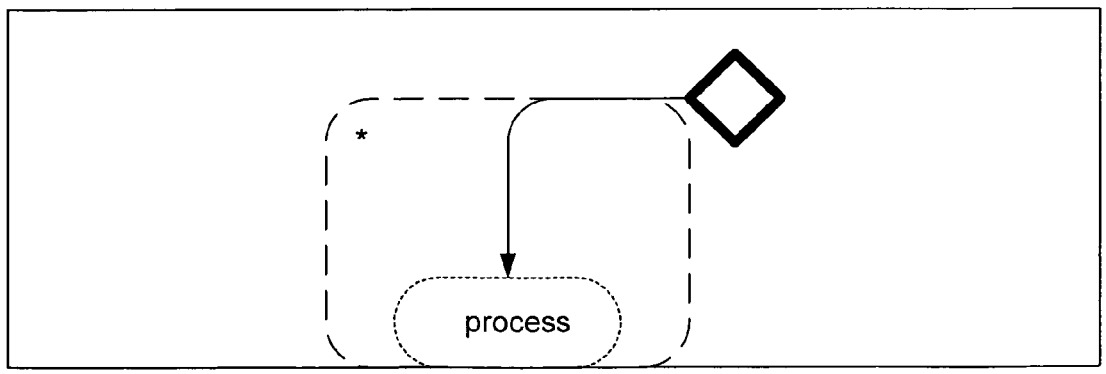

Fig. 20c

Example

```xml
<schedule name="loopExample">

<header>
<portList>
  <port name="p"/>
</portList>
<messageList>
  <message name-"mTrue"/>
  <message name="m"/>
</messageList>
</header>

<switch>
  <branch>
    <case>
      <ruleRef location="test"/>
      <msgRef location="mTrue"/>
      <msgRef location="m"/>
    </case>
    <sequence>
      <sink>
        <portRef location="p"/>
        <msgRef location="m"/>
      </sink>
      <call>
        <scheduleRef location="loopExample"/>
        <portRef location="p"/>
      </call>
```

Fig. 20d

| Map (EBNF) | |
|---|---|
| map | ::= assignmentList process contextRef? |
| assignmentList | ::= *assignmentList* assignment* |
| assignment | ::= *assignment* messageRef portRef |

Fig. 21a

| Map (XML) |
|---|
| <!ELEMENT map ( (zero \| sequence \| switch \| copy \|<br>   partition \| connect \| cut), assignmentList, contextRef?)><br><br><!ELEMENT assignmentList (assignment*)><br><br><!ELEMENT assignment (messageRef, portRef)> |

Fig. 21b

| Example |
|---|
| ```
<map>
  <assignmentList>
    <assignment>
      <messageRef location="m0"/>
      <portRef location="p1"/>
    </assignment>
  </assignmentList>
  <sequence>
    <sink>
      <portRef location="p0"/>
      <messageRef location="m0"/>
    </sink>
    <source>
      <portRef location="p1"/>
      <message location="m1"/>
    </source>
  </sequence>
</map>
``` |

Fig. 21c

| Copy (EBNF) | |
|---|---|
| copy | ::= copy process contextRef? |

Fig. 22a

| Copy (XML) |
|---|
| <!ELEMENT copy ( (zero \| sequence \| switch \| map \| copy \| partition \| connect \| cut), contextRef?)> |

Fig. 22b

| Partition (EBNF) | |
|---|---|
| partition | ::= process* contextRef? |

Fig. 23a

| Partition (XML) |
|---|
| <!ELEMENT partition ( (zero \| sequence \| switch \| map \| copy \| partition \| connect \| cut)*, contextRef?)> |

Fig. 23b

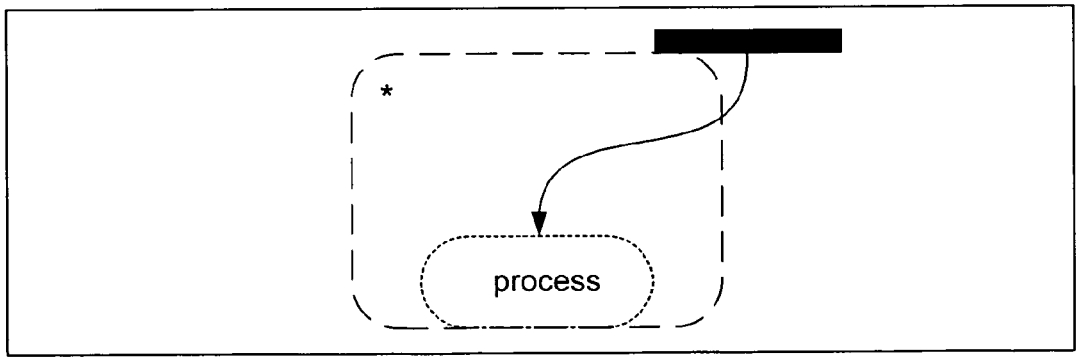

Fig. 23c

| Connect (EBNF) | | |
|---|---|---|
| connect | ::= | process process connectionList contextRef? |
| connectionList | ::= | *connectionList* portRef PortRef |

Fig. 24a

| Connect (XML) |
|---|
| <!ELEMENT connect ((zero \| sequence \| switch \| map \| copy \| partition \| connect \| cut), (zero \| sequence \| switch \| map \| copy \| partition \| connect \| cut), connectionList, contextRef?)><br><br><!ELEMENT connectionList (connection*)><br><br><!ELEMENT connection (portRef, portRef)> |

Fig. 24b

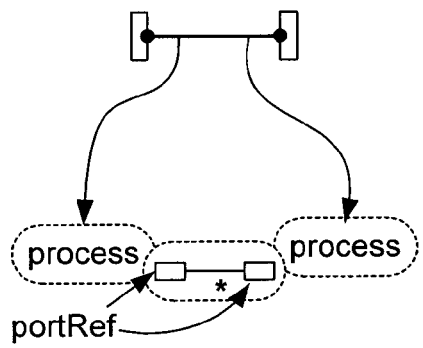

Fig. 24c

| Cut (EBNF) |
|---|
| cut ::= process process process contextRef? |

Fig. 25a

| Cut (XML) |
|---|
| <!ELEMENT cut ((zero \| sequence \| switch \| map \| copy \| partition \| connect \| cut), (zero \| sequence \| switch \| map \| copy \| partition \| connect \| cut), (zero \| sequence \| switch \| map \| copy \| partition \| connect \| cut), contextRef?)> |

Fig. 25b

```
<map>
  <cut>
    <partition>
      <sequence>
        <sink> <portRef location="x"/> <messageRef location="y"/> </sink>
      </sequence>
      <sequence>
        <source> <portRef location="u"/> <messageRef location-"y"/> </source>
      </sequence>
    </partition>
    <partition>
      <sequence>
        <sink> <portRef location="u"/> messageRef location="y"/> </sink>
      </sequence>
      <sequence>
        <source> <portRef location="z"/> <messageRef location="w"/> </source>        </sequence>
    </partition
    <sequence>
      <sink> <portRef location="u"/> <messageRef location="v"/> </sink>
    </sequence>
  </cut>
  <assignmentList>
    <assignment>
      <messageRef location="y"/> <portRef location="z"/>
    </assignment>
  </assignmentList>
</map>
```

Fig. 26a

```
<connect>
  <sequence>
    <sink> <portRef loction="x"/> <messageRef location="y"/> </sink>
  </sequence>
  <sequence>
    <source> <portRef location="z"/> <messageRef location="w"/> </source>
  </sequence>
  <connectionList>
    <conection>
      <portRef location="x"/> <portRef location="z"/>
    </connection>
  </connectionList>
</connect?
```

```
01  <schedule name="customer">
02
03  <header>
04    <portList>
05      <port name="pSendPO"/>
06      <port name="pReceiveConf"/>
07      <port name="pReceiveETA"/>
08      <port name="pReceiveInvoice"/>
09      <port name="pSendPayment"/>
10    </portList>
11    <messageList>
12      <message name="mPO"/>
13      <message name="mConf"/>
14      <message name="mETA"/>
15      <message name="mInvoice"/>
16      <message name="mPayment"/>
17    </messageList>
18  </header>
19
20  <sequence>
21    <source> <portRef location="pSendPO"/>
22             <messageRef location="mPO"/> </source>
23    <sink>  <portRef location="pReceiveConf"/>
24             <messageRef location="mConf"/> </sink>
25    <task>
26      <sink> <portRef location-"pReceiveETA"/>
27             <messageRef location="mETA"/> </sink>
28      <sink> <portRef location="pReceiveInvoice"/>
29             <messageRef location-"mInvoice"/> </sink>
30    </task>
31    <source> <portRef location="pSendPayment"/>
32             <message location="mPayment"/> </source>
33  </sequence>
34
35  </schedule>
```

Fig. 27b

```
01  <schedule name="supplier">
02
03  <header>
04    <portList>
05      <port name="pReceivePO"/>
06      <port name="pSendconf"/>
07      <port name="pSendShip"/>
08      <port name="pSendInvoice"/>
09      <port name="pReceivePayment"/>
10    </portList>
11    <messageList>
12      <message name="mPO"/>
13      <message name="mConf"/>
14      <message name="mShip"/>
15      <message name="mInvoice"/>
16      <message name="mPayment"/>
17    </messageList>
18  </header>
19
20  <sequence>
21    <sink> <portRef location="pReceivePO"/>
22           <messageRef location="mPO"/> </sink>
23    <source> <portRef location="pSendConf"/>
24           <messageRef location="mConf"/> </source>
25    <source> <portRef location="pSendShip"/>
26           <messageRef location="mShip"/> </source>
27    <source> <portRef location="pSendInvoice"/>
28           <messageRef location="mInvoice"/> </source>
29    <sink> <portRef location="pReceivePayment"/>
30           <messageRef location="mPayment"/> </sink>
31  </sequence>
32
33  </schedule?
```

Fig. 28b

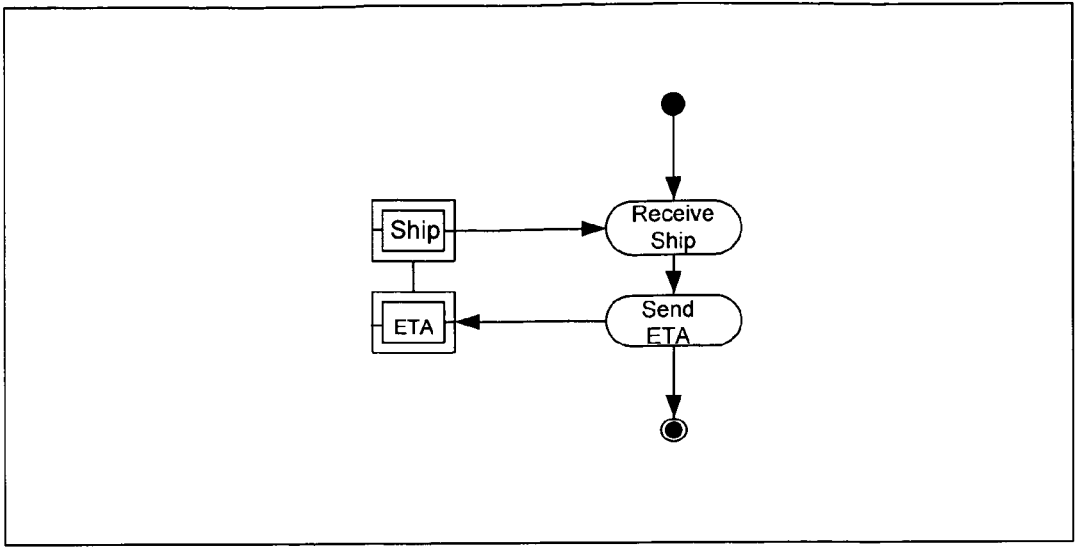

Fig. 29a

```
01   <schedule name="shipper">
02
03   <header>
04      <portList>
05         <port name="pReceiveShip"/>
06         <port name="pSendETA"/>
07      </portList>
08      <messageList>
09         <message name="mShip"/>
10         <message name="mETA"/>
11      <messageList>
12   </header>
13
14   <sequence>
15      <sink> <portRef location="pReceiveShip"/>
16             <messageRef location="mShip"/> </sink>
17      <source> <portRef location="pSendETA"/>
18             <messageRef location="mETZ"/> </source>
19   </sequence>
20
21   </schedule>
```

Fig. 29b

```
01  <schedule name="customerSupplier">
02
03  <header>
04     <portList>
05        <port name="pCustomerPO"/>
06        <port name="pSupplierPO"/>
07        <port name="pCustomerPOConf"/>
08        <port name="pSupplierPOConf"/>
09        <port name="pCustomerETA"/>
10        <port name="pSupplierETA"/>
11        <port name="pCustomerInvoice"/>
12        <port name="pSupplierInvoice"/>
13        <port name="pCustomerPayment"/>
14        <port name="pSupplierPayment"/>
15        <port name="pSupplierShip"/>
16        <port name="pShipperShip"/>
17     </portList>
18  </header>
19
20  <connect>
21     <sequence>
22        <call>  <schedRef location="customer"/>
23                <portRef location="pCustomerPO"/>
24                <portRef location="pCustomerPOConf"/>
25                <portRef location="pCustomerETA"/>
26                <portRef location="pCustomerInvoice"/>
27                <portRef location="pCustomerPayment"/> </call>
28     </sequence>
29     <connect>
30        <sequence>
31           <call>  <schedRef location="supplier"/>
32                   <portRef location="pSupplierPO"/>
33                   <portRef location="pSupplierPOConf"/>
34                   <portRef location="pSupplierShip"/>
35                   <portRef location="pSupplierInvoice"/>
36                   <portRef location="pSupplierPayment"/> </call>
37        </sequence>
38        <sequence>
39           <call>  <schedRef location="shipper"/>
40                   <portRef location="pShipperShip"/>
41                   <portRef location="pSupplierETA"/> </call>
42        </sequence>
```

Fig. 30b

```
43    <connectionList>
44        <connection> <portRef location="pSupplierShip"/>
45                     <portRef location="pShipperShip"/> <connection>
46    </connectionList>
47  </connect>
48  <connectionList>
49      <connection> <portRef location="pCustomerPO"/>
50                   <portRef location="pSupplierPO"/> </connection>
51      <connection> <portRef location="pCustomerPOConf'/>
52                   <portRef location="pSupplierPOConf'/> </connection>
53      <connection> <portRef location="pCustomerETZ"/>
54                   <portRef location="pSupplierETA"/> </connection>
55      <connection> <portRef location="PCustomerInvoice"/>
56                   <portRef location="pSupplierInvoice"/> </connection>
57      <connection> <portRef location="pCustomerPayment"/>
58                   <portRef location="pSupplierPayment"/> </connection>
59    </connectionList>
60  </connect>
61
62  </schedule>
```

Fig. 30c

MODEL FOR BUSINESS WORKFLOW PROCESSES

TECHNICAL FIELD

The present invention relates to computer processes, and more particularly to a system and method for modeling business workflow processes based on process algebra and reducing the model to a useful programming language for use in real world applications.

BACKGROUND OF THE INVENTION

Transaction processing systems have lead the way for many ideas in distributed computing and fault-tolerant computing. For example, transaction processing systems have introduced distributed data for reliability; availability, and performance, and fault tolerant storage and processes, in addition to contributing to a client-server model and remote procedure call for distributed computation. Importantly, transaction processing introduced the concept of transaction ACID properties—atomicity, consistency, isolation and durability that has emerged as a unifying concept for distributed computations. Atomicity refers to a transaction's change to a state of an overall system happening all at once or not at all. Consistency refers to a transaction being a correct transformation of the system state and essentially means that the transaction is a correct program. Although transactions execute concurrently, isolation ensures that transactions appear to execute before or after another transaction because intermediate states of transactions are not visible to other transactions (e.g., locked during execution). Durability refers to once a transaction completes successfully (commits) its activities or its changes to the state become permanent and survive failures.

Many applications for workflow tools are internal to a business or organization. With the advent of networked computers and modems, computer systems at remote locations can now easily communicate with one another. This allows computer system workflow applications to be used between remote facilities within a company. Workflow applications can also be of particular utility in processing business transactions between different companies. Automating such processes can result in significant improvements in efficiency, not otherwise possible. However, this inter-company application of workflow technology requires co-operation of the companies and proper interfacing of the individual company's existing computer systems.

A fundamental concept of workflow analysis is that any business process can be interpreted as a sequence of basic transactions called workflows. Every workflow has a customer, a performer, and conditions of satisfaction. The customer and performer are roles that participants can take in workflows. In addition, each workflow can have observers. In conventional business workflow systems, a transaction comprises a sequence of operations that change recoverable resources and data from one consistent state into another, and if a failure occurs before the transaction reaches normal termination those updates will be rolled back or undone. ACID transactions control concurrency by isolating atomic transitions against each other to create a serializable schedule by delaying updates until the commit of transactions. This isolation limits granularity viewed by an observer to the size of the parent transactions, until all child transactions commit within a parent transaction. Therefore, application specific programs cannot be invoked and monitoring of transactions by user's cannot be performed based on any actions occurring within a transaction, until the transaction fails or commits.

Traditional transaction system models assume that transactions are concurrent and are related in such a manner that whether or not a transaction commitment has occurred needs to be communicated up a chain to a higher level parent transaction. Consequently, the fact that a transaction is an independent transaction is not fully considered. Additionally, concurrent transactions within a parent transaction must synchronize by communicating with one another, thus reducing overall system throughput. Furthermore, current business workflow software systems provide scheduling software that requires binding within scheduling to couple a schedule to real world applications and technologies. Such types of schedule software require sophisticated programmers to implement software for a given business workflow model. Furthermore, these types of schedule software often require modification of each schedule for different technologies.

Accordingly, there is a strong need in the art for a system and/or method for modeling a business workflow process that mitigates some of the aforementioned deficiencies associated with conventional modeling of business workflow processes.

SUMMARY OF THE INVENTION

The present invention relates to a system and methodology of reducing process algebra (employed to facilitate modeling business workflow processes) to a language that facilitates modeling business workflow processes. A typical business workflow process in accordance with the present invention may include a plurality of business processes defined by a number of operations—the operations defining constraints on the business processes. The present invention provides for reducing any of a plurality of conventional process algebri to a model for business workflow applications. For example, combinators (a Π-calculus derivative) can be employed in modeling a business workflow application. The model is then reduced to an application programming language to allow users to choose between features of the present invention and conventional features associated with modeling application specific business processes. Preferably, the application program language is a scheduling language that may be represented as a graphical user interface program convertible to a schedule written in a programmable language. The present invention facilitates unsophisticated programmers in implementing modeling techniques for specific business workflow processes. The present invention further provides expression for viewing and grouping a workflow schedule separate from any binding associated with a specific implementation and a specific technology, which allows for a common business model to be utilized across a variety of implementations and technologies.

The present invention provides for explicitly representing parallelism within a business workflow process by separating communicating concurrent transactions from independent concurrent transactions. By separating communicating concurrent transactions from independent concurrent transactions, problems associated with deadlock in conventional systems are mitigated. Furthermore, throughput of an overall business process is enhanced because the independent concurrent transactions may be performed on machines isolated from machines performing actions corresponding to communicating concurrent transactions allowing the processes to be distributed across several machines.

According to the present invention, transaction boundaries are user-definable in workflow schedules. A workflow user (with a graphical user interface or a schedule definition language) groups sets of component actions together into transactions within a schedule; transaction boundaries are determined based on transactional scope of the groupings. A list of component actions is created and grouped into transaction groups according to desired schedule functionality conditions. Transaction boundaries are embedded in a list at the beginning of each said transaction group according to ordering or grouping of component actions. Allowing the user to define transaction boundaries provides fine-grained access to schedule status information with the capability of generating and analyzing history reports for schedule execution. Present workflow systems follow the principle known as ACID (Atomicity, Consistency, Isolation, Durability). The present invention relaxes isolation of certain transactions, such that programmers can define transactional boundaries in order to increase granularity of a transaction at an action level and provide visibility of transactions at intermediate steps. Since isolation has been relaxed, a failed transaction cannot simply be rolled back. Accordingly, the present invention allows for compensation with respect to failed transactions. Programs can be executed as specified by a programmer upon a given action or transaction failure. The system and methodology of the present invention affords users increased control and visibility over business workflow operations as compared to conventional systems and methodologies.

The present invention provides not only concurrency with respect to transactions but also concurrency with respect to actions performed in an operation. Synchronized constraints of transactions are expressed with respect to completion of autonomous operations as opposed to expressing synchronized constraints through communication between transactions; decreased operation time is the result.

According to one aspect of the invention, a method of modeling a business process having a plurality of operations is provided. The method comprises the steps of using a first verb of a process algebra to represent at least one independent operation, using a second verb of the process algebra to represent a set of interdependent operations and using the first and second verbs respectively to differentiate the at least one independent operation from the set of interdependent operations.

In another aspect of the invention a system is provided for facilitating modeling of business processes comprised of a plurality of business operations being representable at a transaction level and an action level. The system comprises a computer-readable medium and a plurality of computer-executable components. The components comprise a user interface component and a plurality of model components accessible through the user interface component and adapted to allow a user to create a model of a business process. The plurality of model components comprise a distinguishing model component for distinguishing between concurrent autonomous business operations and concurrent interdependent business operations.

Yet another aspect of the invention a system provides for facilitating modeling of business processes comprised of a plurality of business operations representable at a transaction level and an action level. The system comprises a computer-readable medium and a plurality of computer-executable components. The components comprise a user interface component and a plurality of model components accessible through the user interface component and adapted to allow a user to create a model of a business process. The plurality of model components comprise at least one boundary establishing component for defining transaction boundaries.

According to a further aspect of the invention, a system is provided for facilitating modeling of business processes comprised of a plurality of business operations representable at a transaction level and an action level. The system comprises a computer-readable medium and a plurality of computer-executable components. The components comprise a user interface component and a plurality of model components accessible through the user interface component and adapted to allow a user to create a model of a business process. The plurality of model components comprise a component for defining concurrent synchronizing constraints as occurring upon completion of the autonomous operations.

In accordance with another aspect of the invention, a method is provided for representing business processes as constraints on the synchronization of a plurality of autonomous and interdependent business operations. The method comprises distinguishing between synchronization of autonomous concurrent operations from interdependent concurrent operations, expressing synchronization constraints on completion of autonomous concurrent operations and allowing association of transaction operations and groups of business operations.

Another aspect of the invention provides for a business process scheduling software. The business scheduling software comprises a first component adapted to allow a user to distinguish between synchronization of autonomous concurrent operations from interdependent concurrent operations, a second component adapted to allow a user to express synchronization constraints on completion of autonomous concurrent operations and a third component adapted to allow association of transaction operations and groups of business operations.

In accordance with yet another aspect of the invention, a system is provided for representing business processes as constraints on the synchronization of a plurality of autonomous and interdependent business operations. The system comprises means for distinguishing between synchronization of autonomous concurrent operations from interdependent concurrent operations, means for expressing synchronization constraints on completion of autonomous concurrent operations and means for allowing association of transaction operations and groups of business operations.

To the accomplishment of the foregoing and related ends, the invention then, comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed and the present invention is intended to include all such embodiments and their equivalents. Other objects, advantages and novel features of the invention will become apparent from the following detailed description of the invention when considered in conjunction with the drawings.

BRIEF DESCRIPTION OF THE DRAWINGS

FIG. 1d illustrates a process algebra being reduced to a state for business workflow processes in accordance with one aspect of the present invention.

FIG. 2b illustrates a diagrammatic view of a system for modeling a business workflow process in accordance with an alternate environment of the present invention.

FIG. 6 illustrates a modeling scheduling language syntax in extended Backus-Naur Form Notation (EBNF) in accordance with one aspect of the present invention.

FIG. 7a illustrates a schedule construct in EBNF notation in accordance with one aspect of the present invention.

FIG. 7b illustrates a schedule construct in XML notation in accordance with one aspect of the present invention.

FIG. 7c illustrates an example of a simple schedule in accordance with one aspect of the present invention.

FIG. 8a illustrates a port construct in EBNF notation in accordance with one aspect of the present invention.

FIG. 8b illustrates a port construct in XML notation in accordance with one aspect of the present invention.

FIG. 9a illustrates a message construct in EBNF notation in accordance with one aspect of the present invention.

FIG. 9b illustrates a message construct in XML notation in accordance with one aspect of the present invention.

FIG. 10a illustrates a contexts construct in EBNF notation in accordance with one aspect of the present invention.

FIG. 10b illustrates a contexts construct in XML notation in accordance with one aspect of the present invention.

FIG. 13a illustrates a zero construct in EBNF notation in accordance with one aspect of the present invention.

FIG. 13b illustrates a zero construct in XML notation in accordance with one aspect of the present invention.

FIG. 13c illustrates a graphical image representing a zero construct in accordance with one aspect of the present invention.

FIG. 14a illustrates a sequence construct in EBNF notation in accordance with one aspect of the present invention.

FIG. 14b illustrates a sequence construct in XML notation in accordance with one aspect of the present invention.

FIG. 17a illustrates a call construct in EBNF notation in accordance with one aspect of the present invention.

FIG. 17b illustrates a call construct in XML notation in accordance with one aspect of the present invention.

FIG. 18a illustrates a return construct in EBNF notation in accordance with one aspect of the present invention.

FIG. 18b illustrates a return construct in XML notation in accordance with one aspect of the present invention.

FIG. 19a illustrates a release construct in EBNF notation in accordance with one aspect of the present invention.

FIG. 19b illustrates a release construct in XML notation in accordance with one aspect of the present invention.

FIG. 20a illustrates a switch construct in EBNF notation in accordance with one aspect of the present invention.

FIG. 20b illustrates a switch construct in XML notation in accordance with one aspect of the present invention.

FIG. 20c illustrates a graphical image representing a switch construct in accordance with one aspect of the present invention.

FIG. 20d illustrates implementation of the switch construct in providing a loop function in accordance with one aspect of the present invention.

FIG. 21a illustrates a map construct in EBNF notation in accordance with one aspect of the present invention.

FIG. 21b illustrates a map construct in XML notation in accordance with one aspect of the present invention.

FIG. 21c illustrates implementation of a map construct in a schedule in accordance with one aspect of the present invention.

FIG. 22a illustrates a map construct in EBNF notation in accordance with one aspect of the present invention.

FIG. 22b illustrates a map construct in XML notation in accordance with one aspect of the present invention.

FIG. 23a illustrates a partition construct in EBNF notation in accordance with one aspect of the present invention.

FIG. 23b illustrates a partition construct in XML notation in accordance with one aspect of the present invention.

FIG. 23c illustrates a graphical image representing a partition construct in accordance with one aspect of the present invention.

FIG. 24a illustrates a connect construct in EBNF notation in accordance with one aspect of the present invention.

FIG. 24b illustrates a connect construct in XML notation in accordance with one aspect of the present invention.

FIG. 24c illustrates a graphical image representing a connect construct in accordance with one aspect of the present invention.

FIG. 25a illustrates a cut construct in EBNF notation in accordance with one aspect of the present invention.

FIG. 25b illustrates a cut construct in XML notation in accordance with one aspect of the present invention.

FIG. 26a illustrates an example of connecting ports using a cut expression in a schedule in accordance with one aspect of the present invention.

FIG. 27b illustrates a customer business workflow schedule of the workflow process in FIG. 27a written in SLANG syntax in accordance with one aspect of the present invention.

FIG. 28b illustrates a supplier business workflow schedule of the workflow process in FIG. 28a written in SLANG syntax in accordance with one aspect of the present invention.

FIG. 29a illustrates a graphical representation of a shipper business workflow process in accordance with one aspect of the present invention.

FIG. 29b illustrates a shipper business workflow schedule of the workflow process in FIG. 28a written in SLANG syntax in accordance with one aspect of the present invention.

FIGS. 30b-c illustrate a combined business workflow schedule of the workflow process in FIG. 30a written in SLANG syntax in accordance with one aspect of the present invention.

DETAILED DESCRIPTION OF THE INVENTION

Figure 1A:
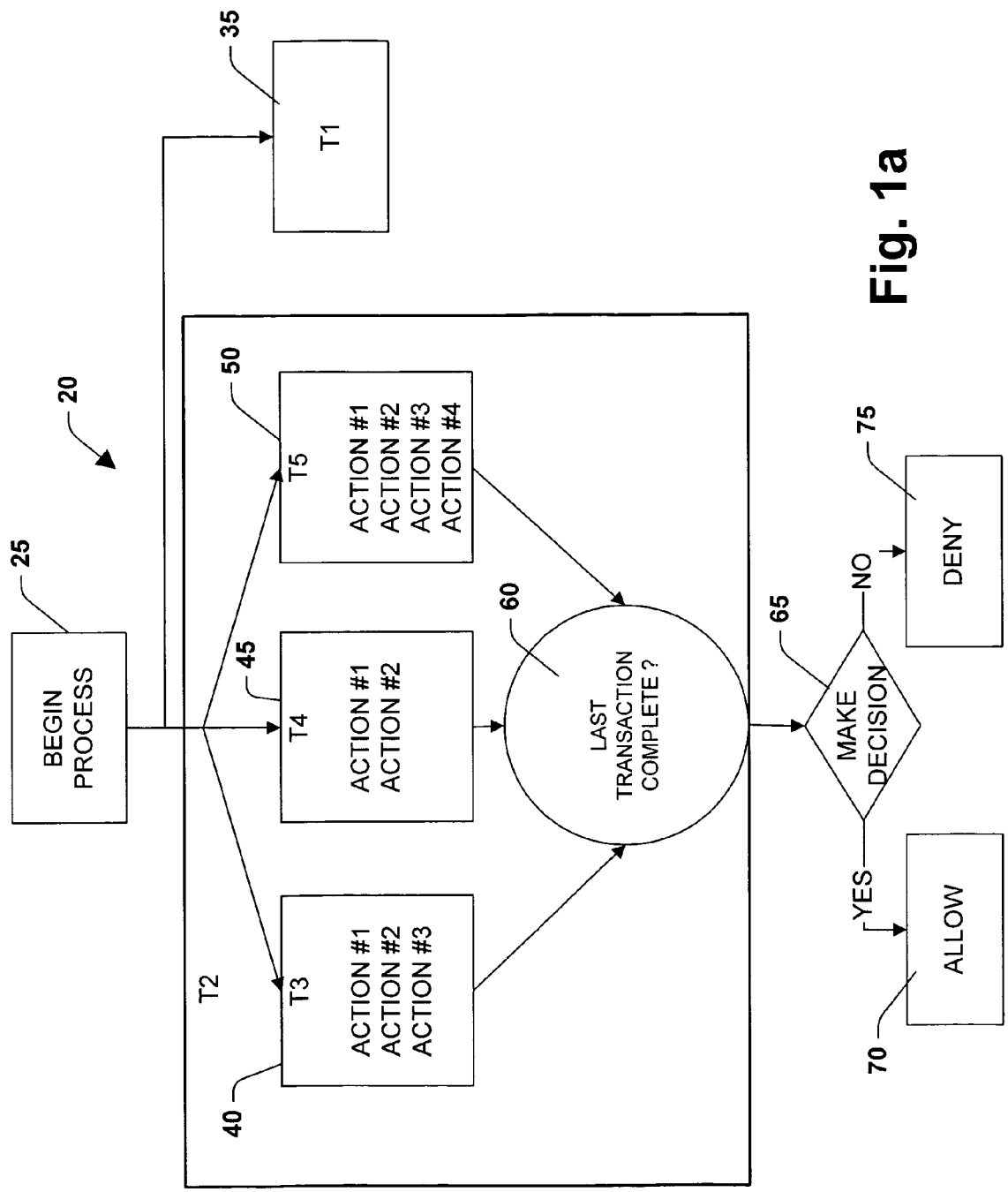
FIG. 1a illustrates a block diagram of a business workflow model in accordance with one aspect of the present invention.

The present invention is now described with reference to the drawings, wherein like reference numerals are used to refer to like elements throughout. The present invention is described with reference to a system and method for modeling a business workflow process. The system and method employs process algebra techniques to arrive at the model. The model is reduced to an application programming language that can be utilized in a schedule file for a variety of business workflow technologies. The programming language allows users to implement various features of the model during implementation of the user's particular application to create custom business workflow models. The schedule can then be bound to application program interfaces, such as the common object model (COM) interfaces, through a separate binding file, such that the same business workflow model can be implemented for a variety of business workflow technologies.

FIG. 1a illustrates a flow diagram of a business process 20 employing the model of the present invention. In step 25, the process begins and divides into an independent business transaction (T1) 35 and an interdependent business transaction (T2) 30. A transaction may include a single action in a business operation, a single business operation or a number of business operations in a business process. The model allows for explicit separation of independent business transaction (T1) 35 from the interdependent business transaction (T2) 30. Although independent transaction (T1) 35 and interdependent transaction (T2) 30 can be executed concurrently, the model allows for independent transactions to be executed on machines separated and isolated from the machine utilized to execute interdependent transactions, because interdependent transactions do not require information regarding results of independent transactions. Therefore, significant throughput and decreased latency of a business process is achieved employing the model of the present invention.

Interdependent transaction (T2) 30 is a parent transaction and includes interdependent child transaction (T3) 40, interdependent child transaction (T4) 45 and interdependent child transaction (T5) 50, which execute concurrently. Interdependent parent transaction (T2) 30 does not commit until the last of the concurrent child interdependent transactions 40, 45 and 50 commit. Therefore, the committing of the interdependent parent transaction (T2) 30 is not dependent on the communication between the concurrent child interdependent transactions as is conventional, but commits after the last concurrent child interdependent transaction commits, again resulting in decreased latency of the business process. Conventional systems isolate concurrent interdependent transactions from one another such that each transaction views other concurrent interdependent transactions as committing before or after the viewing transaction (e.g., sequential). The present model loosens isolation, such that committing of concurrent interdependent transactions occurs after a final concurrent interdependent transaction has committed, thus providing another level of parallelism (e.g., communicating parallelism). After each concurrent interdependent transaction commits, data is transferred to step 60 which determines whether or not the last transaction has committed. Upon commitment of the last concurrent interdependent transaction, the parent interdependent transaction (T2) 30 commits and the data is transferred concurrently to step 65. At step 65, the business process 20 determines whether a decision is allowed (Yes) in step 70 or denied (No) in step 75 based on the transmitted data.

In addition to the above stated features, the model allows for concurrent execution of actions within transactions. Transactions will not commit until a final action within a transaction has completed. The model also allows for explicit determination of transaction boundaries in addition to increased granularity of transactions. For example, transaction (T5) 50 has been defined as having four actions, while transaction (T3) 40 and (T4) 45 has been defined as including three and two actions, respectively. Transaction (T2) 30 has been defined as including transaction (T3) 40, (T4) 45 and (T5) 50, but can be defined as any two of transaction (T3) 40, (T4) 45 and (T5) 50 or simply any of transaction (T3) 40, (T4) 45 and (T5) 50. Therefore, the present invention allows for defining transaction boundaries and increasing granularity. Additionally, actions can happen concurrently independent of isolation because the data that the actions work on are independent of one another. Since isolation of the model has been relaxed to allow for increased granularity, transactions cannot simply be rolled back upon a failure of a single transaction, as is conventional. This is because the data associated with committed interdependent transactions is not locked after commitment, and therefore data may be compromised before another concurrent interdependent transaction fails. Therefore, the present invention allows for compensation to be invoked upon a failure of a transaction or an action. The compensation can be invoked to include compensating tasks for committed interdependent concurrent transactions and all committed transactions and actions outside the parent transaction. However, compensation upon a failure can include any compensating action to be invoked based on a particular application or desire.

Figure 1B:
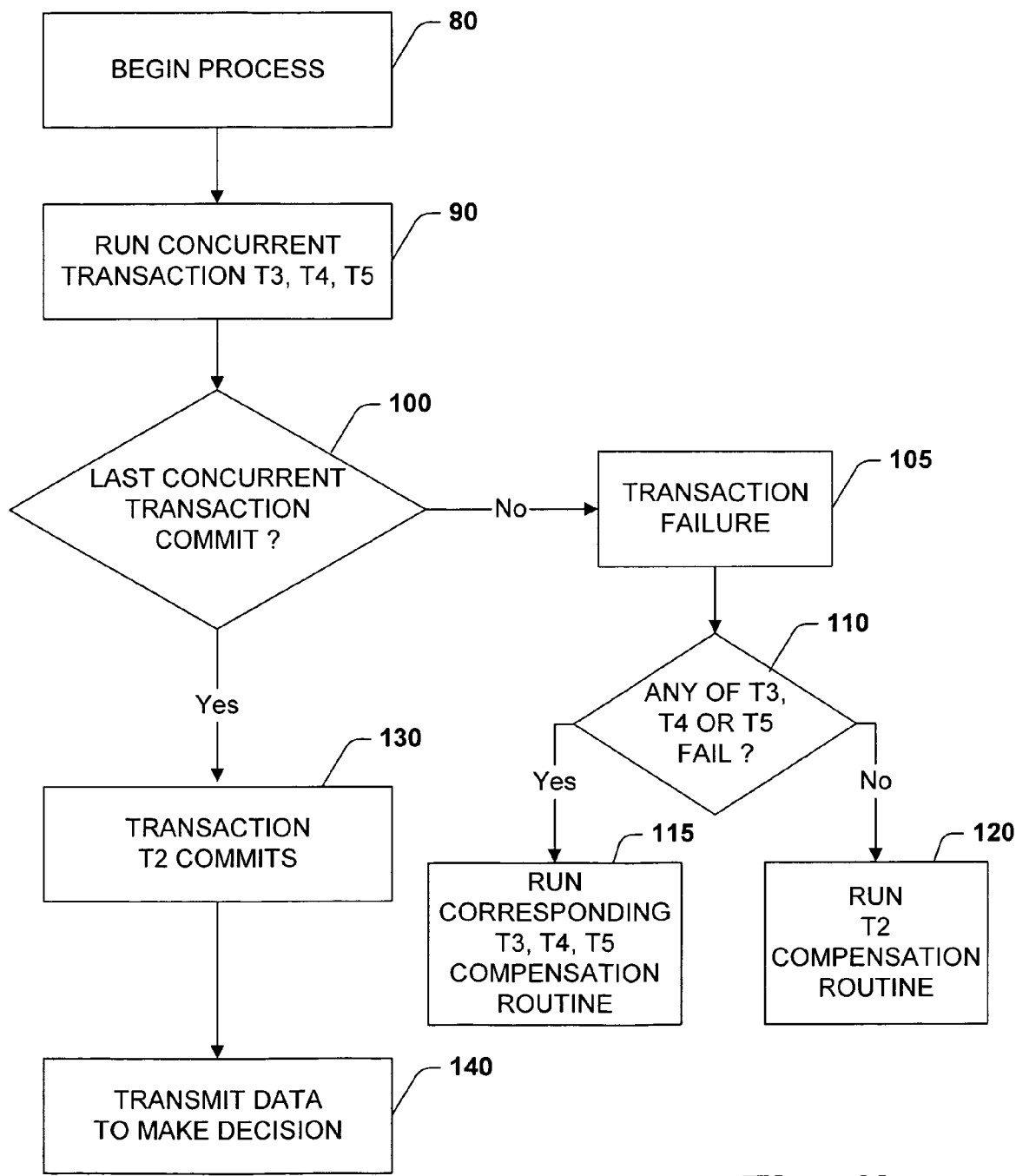
FIG. 1b is a flow chart illustrating a compensation routine in accordance with one aspect of the present invention.

FIG. 1b illustrates invocation of a compensation routine upon a failure of any of concurrent child interdependent transactions (T3) 40, (T4) 45 and (T5) 50 of interdependent parent transaction (T2) 30. At step 80, the interdependent parent transaction (T2) 30 begins executing in the business process 20. At step 90, the concurrent child interdependent transactions (T3) 40, (T4) 45 and (T5) 50 begin execution. The business process then waits for a last concurrent interdependent child transaction to commit at step 100. If all three concurrent child interdependent transactions commit (Yes), the business process advances to step 130 and interdependent parent transaction (T2) 30 commits. The data is then transmitted to a decision maker at step 140. If all three concurrent child interdependent transactions do not commit (No) at step 100, there is a transaction failure with respect to interdependent parent transaction (T2) 30 at step 105. The business process then determines if any of the concurrent child interdependent transactions (T3) 40, (T4) 45 and (T5) 50 have failed at step 110. If one of the concurrent child interdependent transactions (T3) 40, (T4) 45 and (T5) 50 has failed (Yes), a compensation routine is run for the particular failed transaction at step 115. If one of the concurrent child interdependent transactions (T3) 40, (T4) 45 and (T5) 50 has not failed (No), a compensation routine is run with respect to the interdependent parent transaction (T2) 30 at step 120. It is to be appreciated that parent transaction can call compensators within the child transaction or call its own compensators, as a result of a failure. Additionally, calls can be made from the failed transaction and compensation made based on information within the committed transactions. The compensation information may come from a logged database. Since isolation has been loosened with respect to the parent transaction, only data of a child transaction will be locked during execution. Therefore, once the child transaction commits, the failed transaction can access data with respect to any committed transaction.

Figure 1C:
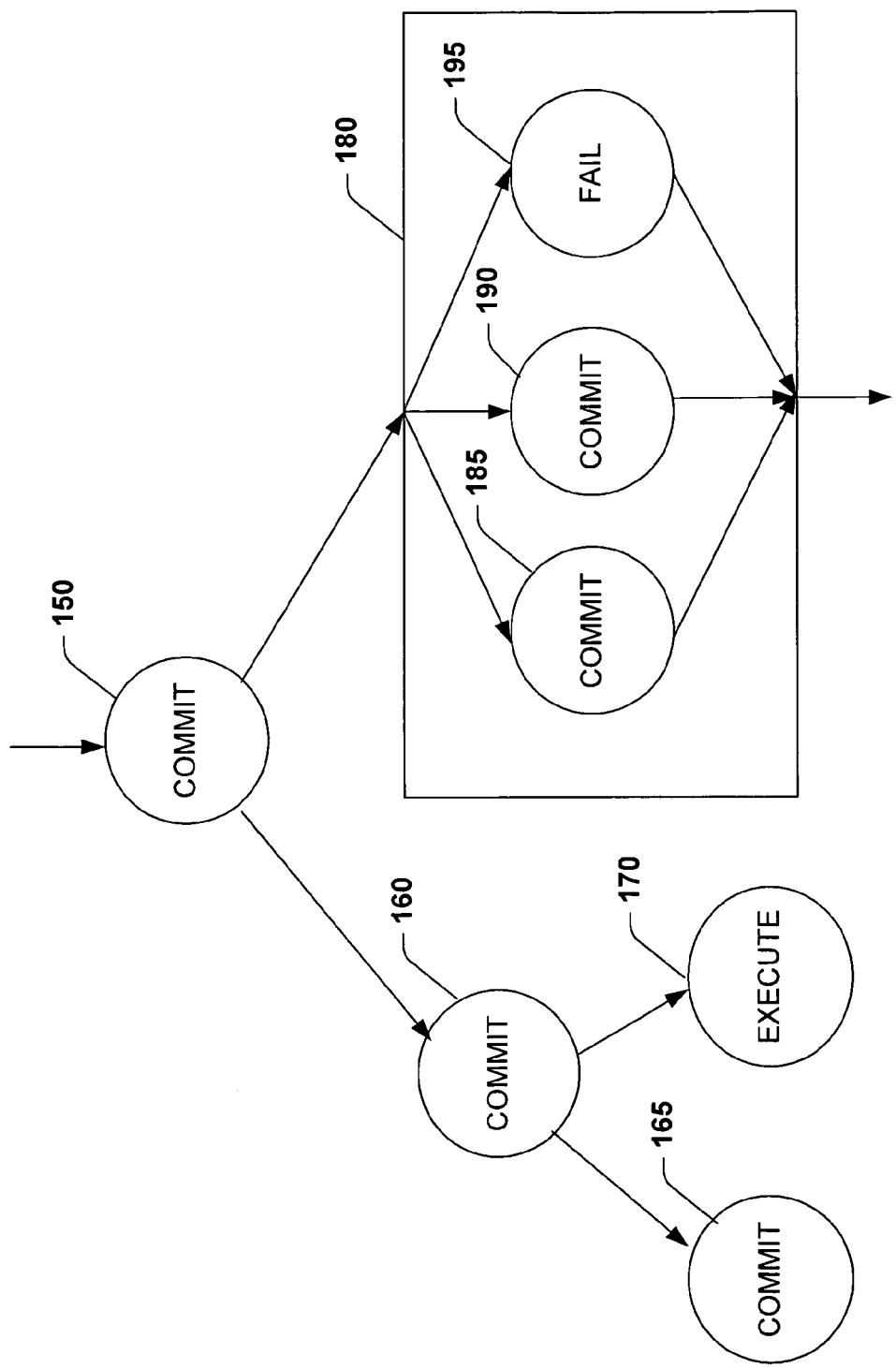
FIG. 1c is a flow chart illustrating a multiple transaction flow in accordance with one aspect of the present invention.

FIG. 1b illustrates compensation of committed interdependent child transactions as a result of a failure of another interdependent child transaction. It is to be appreciated that compensation is also necessary for transactions outside the parent transaction. For example, FIG. 1c illustrates a first transaction 150 committing and dividing into a transaction 160 and an interdependent parent transaction 180. The transaction 160 then commits and divides into transaction 165 and transaction 170. The concurrent interdependent child transactions 185, 190 and 195 begin executing concurrently. In addition, transactions 160, 165 and 170 outside parent transaction 180 begin executing. If during execution, transaction 195 fails, interdependent transactions 185 and 190 that have committed will need compensation. Additionally, transaction 160, 165 and 170 outside parent transaction 180 will need compensation up to a state of the system right after the transaction 150 committed.

FIG. 1d illustrates an example of process algebra utilized in formulating the present model for conducting business workflow transactions. The process algebra of the present model is a derivation of PI calculus (e.g., combinators). However, conventional PI calculus algebra is based on a single verb, while the process algebra of the present invention includes two verbs. The use of two verbs allows for explicitly representing parallelism within the business workflow process by separating communicating concurrent transactions from independent concurrent transactions and mitigating deadlock associated with conventional systems. The process algebra may then be converted to an XML schema. A document type definition for defining data types is illustrated in the attached Appendix.

Figure 2A:
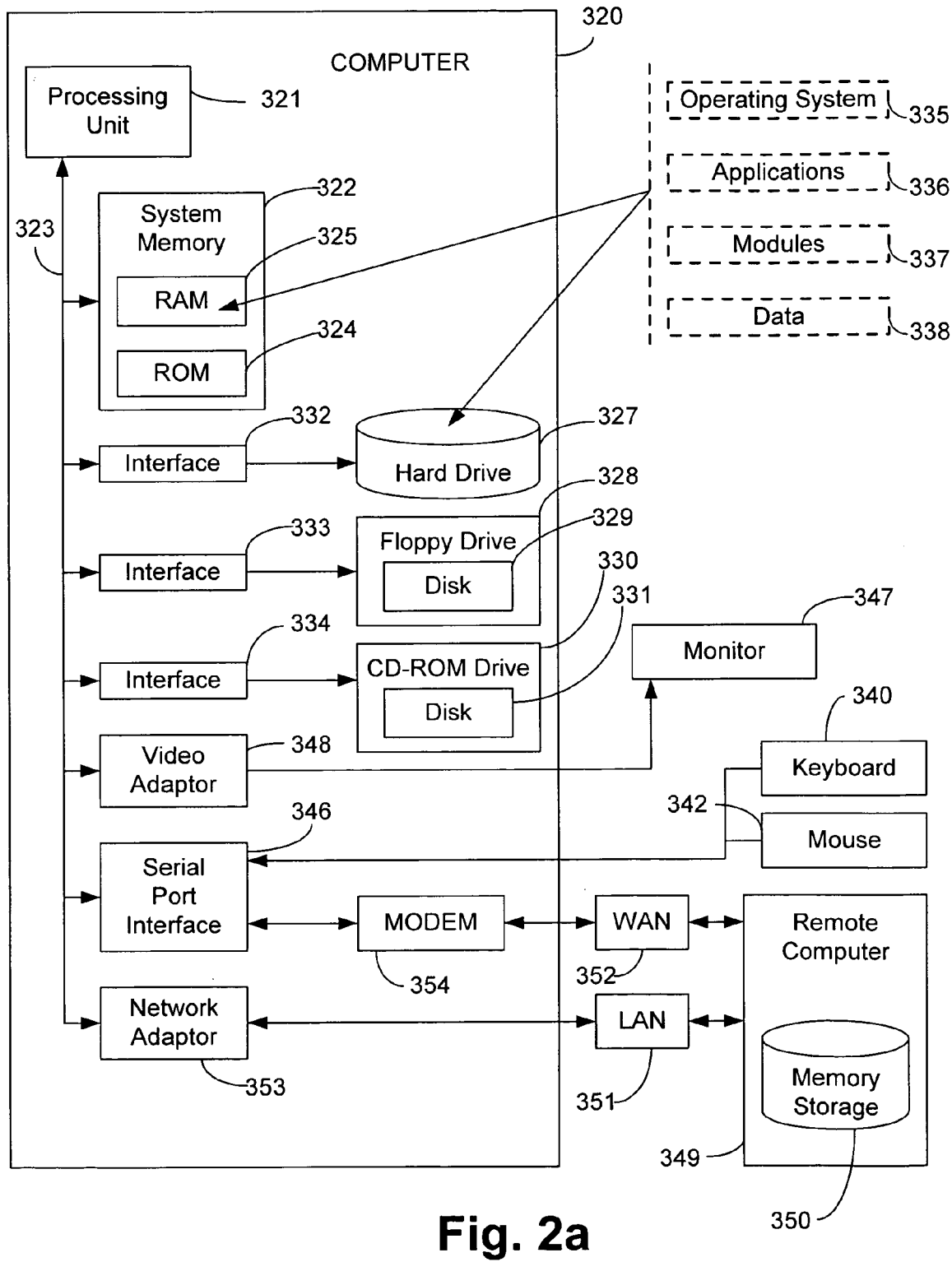
FIG. 2a illustrates a block diagram of a computer system in accordance with an environment of the present invention.

FIG. 2a and the following discussion are intended to provide a brief, general description of a suitable computing environment in which the invention may be implemented. While the invention will be described in the general context of computer-executable instructions of a computer program that runs on a server computer, those skilled in the art will recognize that the invention also may be implemented in combination with other program modules. Generally, program modules include routines, programs, components, data structures, etc. that perform particular tasks or implement particular abstract data types. Moreover, those skilled in the art will appreciate that the invention may be practiced with other computer system configurations, including single- or multi-processor computer systems, minicomputers, mainframe computers, as well as personal computers, hand-held computing devices, microprocessor-based or programmable consumer electronics, and the like. The illustrated embodiment of the invention also is practiced in distributed computing environments where tasks are performed by remote processing devices that are linked through a communications network. But, some embodiments of the invention can be practiced on stand-alone computers. In a distributed computing environment, program modules may be located in both local and remote memory storage devices.

With reference to FIG. 2a, an exemplary system for implementing the invention includes a conventional server computer 320, including a processing unit 321, a system memory 322, and a system bus 323 that couples various system components including the system memory to the processing unit 321. The processing unit may be any of various commercially available processors, including Intel x86, Pentium and compatible microprocessors from Intel and others, including Cyrix, AMD and Nexgen; Alpha from Digital; MIPS from MIPS Technology, NEC, IDT, Siemens, and others; and the PowerPC from IBM and Motorola. Dual microprocessors and other multi-processor architectures also can be used as the processing unit 321.

The system bus may be any of several types of bus structure including a memory bus or memory controller, a peripheral bus, and a local bus using any of a variety of conventional bus architectures such as PCI, VESA, Microchannel, ISA and EISA, to name a few. The system memory includes read only memory (ROM) 324 and random access memory (RAM) 325. A basic input/output system (BIOS), containing the basic routines that help to transfer information between elements within the server computer 320, such as during start-up, is stored in ROM 324.

The server computer 320 further includes a hard disk drive 327, a magnetic disk drive 328, e.g., to read from or write to a removable disk 329, and an optical disk drive 330, e.g., for reading a CD-ROM disk 331 or to read from or write to other optical media. The hard disk drive 327, magnetic disk drive 328, and optical disk drive 330 are connected to the system bus 323 by a hard disk drive interface 332, a magnetic disk drive interface 333, and an optical drive interface 334, respectively. The drives and their associated computer-readable media provide nonvolatile storage of data, data structures, computer-executable instructions, etc. for the server computer 320. Although the description of computer-readable media above refers to a hard disk, a removable magnetic disk and a CD, it should be appreciated by those skilled in the art that other types of media which are readable by a computer, such as magnetic cassettes, flash memory cards, digital video disks, Bernoulli cartridges, and the like, may also be used in the exemplary operating environment.

A number of program modules may be stored in the drives and RAM 325, including an operating system 335, one or more application programs 336, other program modules 337, and program data 338. The operating system 335 in the illustrated server computer is the Microsoft Windows NT Server operating system, together with the before mentioned Microsoft Transaction Server.

A user may enter commands and information into the server computer 320 through a keyboard 340 and pointing device, such as a mouse 342. Other input devices (not shown) may include a microphone, joystick, game pad, satellite dish, scanner, or the like. These and other input devices are often connected to the processing unit 321 through a serial port interface 346 that is coupled to the system bus, but may be connected by other interfaces, such as a parallel port, game port or a universal serial bus (USB). A monitor 347 or other type of display device is also connected to the system bus 323 via an interface, such as a video adapter 348. In addition to the monitor, server computers typically include other peripheral output devices (not shown), such as speakers and printers.

The server computer 320 may operate in a networked environment using logical connections to one or more remote computers, such as a remote client computer 349. The remote computer 349 may be a workstation, a server computer, a router, a peer device or other common network node, and typically includes many or all of the elements described relative to the server computer 320, although only a memory storage device 350 has been illustrated in FIG. 2a. The logical connections depicted in FIG. 2a include a local area network (LAN) 351 and a wide area network (WAN) 352. Such networking environments are commonplace in offices, enterprise-wide computer networks, intranets and the Internet.

When used in a LAN networking environment, the server computer 320 is connected to the local network 351 through a network interface or adapter 353. When used in a WAN networking environment, the server computer 320 typically includes a modem 354, or is connected to a communications server on the LAN, or has other means for establishing communications over the wide area network 352, such as the Internet. The modem 354, which may be internal or external, is connected to the system bus 323 via the serial port interface 346. In a networked environment, program modules depicted relative to the server computer 320, or portions thereof, may be stored in the remote memory storage device. It will be appreciated that the network connections shown are exemplary and other means of establishing a communications link between the computers may be used.

In accordance with practices of persons skilled in the art of computer programming, the present invention is described below with reference to acts and symbolic representations of operations that are performed by the server computer 320, unless indicated otherwise. Such acts and operations are sometimes referred to as being computer-executed. It will be appreciated that the acts and symbolically represented operations include the manipulation by the processing unit 321 of electrical signals representing data bits which causes a resulting transformation or reduction of the electrical signal representation, and the maintenance of data bits at memory locations in the memory system (including the system memory 322, hard drive 327, floppy disks 329, and CD-ROM 331) to thereby reconfigure or otherwise alter the computer system's operation, as well as other processing of signals. The memory locations where data bits are maintained are physical locations that have particular electrical, magnetic, or optical properties corresponding to the data bits.

FIG. 2b illustrates an alternative environment for employing the present invention. A system 360 is shown in which multiple buyers 365 and sellers 370 are electronically linked via a central server 375. As discussed in more detail below, the central server 375 is configured to provide the buyers 365 and sellers 370 with a convenient forum in which to conduct business transactions in accordance with a business workflow methodology described herein. The forum may, for example, be a preestablished Internet web page where buyers 365 are able to submit purchase requests and sellers 370 are able to file responses to these purchase requests. For example, a buyer may be able to file a purchase request in accordance with a purchase request electronic form and the vendor return a purchase request confirmation electronic form. The electronic forms can reside in a database on a central server 375 or can be created based on messages transmitted by buyers 365 and sellers 370.

Each of the buyers 365 and sellers 370 may access the central server 375 in any of a variety of ways. For example, each buyer 365 and seller 370 is shown to be part of separate establishments 380 which include one or more respective computer systems 385 and local servers 390. The computer systems 385 may be, for example, a desktop or laptop computer with a local area network (LAN) interface for communicating over a network backbone 395 to the local server 390. The local servers 390, in turn, interface with the central server 375 via a network cable 400 or the like. It is to be appreciated that while the computer system 385 is depicted communicating with the central server 375 via hardwired network connections, the computer system 385 may interface with the central server 375 using a modem, wireless local area and/or wide area networks, etc. Further, it will be appreciated, that while the buyers 365 and sellers 370 are shown to part of separate establishments, the buyers 365 and sellers 370 can be part of a single establishment and represent different divisions or groups within a single business. Although, an example of an environment has been described with respect to a central server and several clients, it is to be appreciated that the present invention can be employed utilizing a peer to peer communication and composition.

The model of the present invention can be reduced to a programming language. The model of the present invention will now be illustrated with respect to an example of a business workflow process and a scheduling programming language written in XML (hereinafter referred to as SLANG) including syntax that allows for expression of features associated with the model of the present invention. The programming language allows for users to choose between conventional features of business workflow processes and model specific features in formulating custom models for the user's particular business workflow process. The language is inherently concurrent and allows a user to specify dependency and independence between components, transaction, compensation and checkpoint boundaries, as well as mechanisms for abstracting the workflow from the implementations of the components. Although, the present example refers to a scheduling language, it is to be appreciated that the present invention can apply to a variety of application programming language and is not specifically limited to a scheduling language.

The scheduling language provides a mechanism for describing and executing concurrent instances of components. The scheduling language may employ a graphical user interface that can describe dataflow by utilizing a dataflow diagram where actions are connected via data flow between them. The actions can be mapped to invocations on, for example, common object model (COM) objects, messages in queues, or other native technology behavior. The schedule easily maps onto a distributed environment due to its inherent concurrency, and can further be used to compose other schedules. A schedule can be examined at design time for deadlocks. A compiler can detect deadlock conditions between concurrent actions. A schedule can be stored on a file system, in a database, or embedded in a stream in an application. It is to be appreciated that variation of the business workflow process described herein and the programming language implementing the example would be apparent to those skilled in the art.

Figure 3:
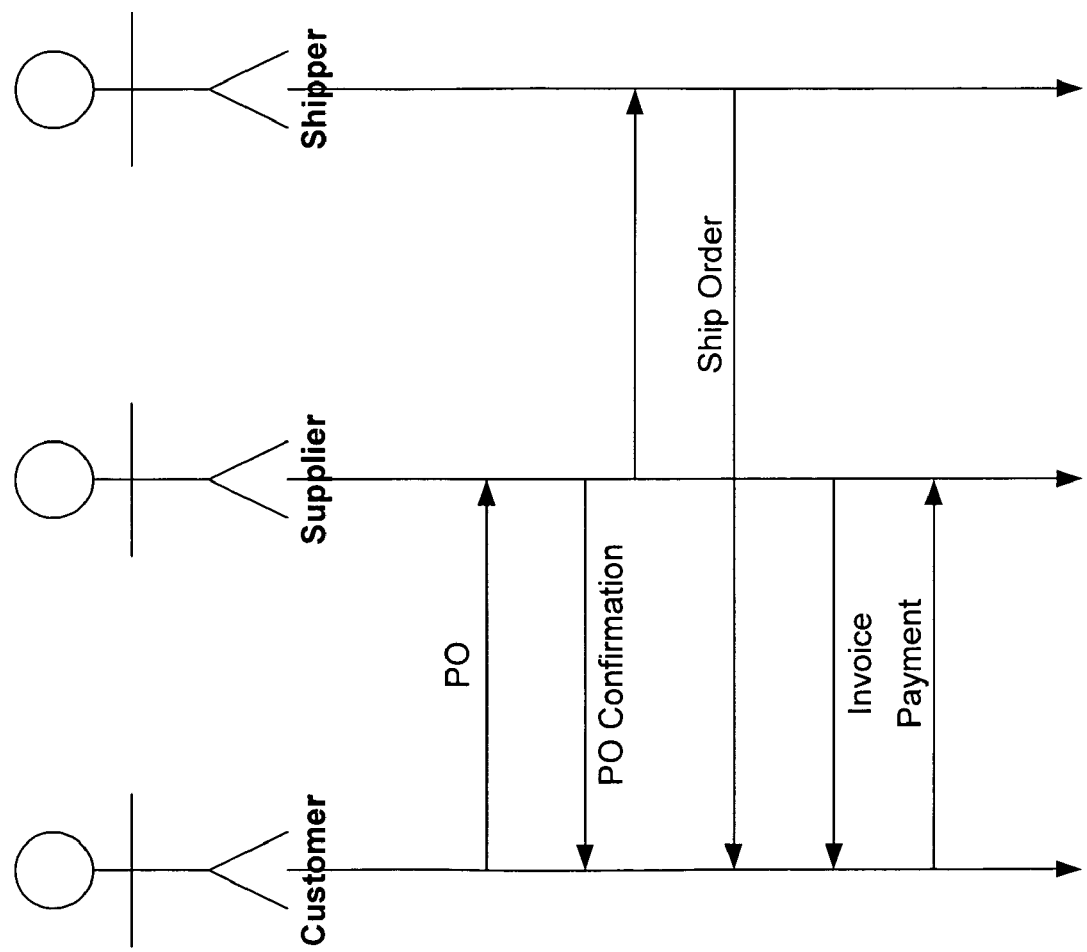
FIG. 3 illustrates a UML interaction diagram of a simplified purchase interaction in accordance with one aspect of the present invention.
Figure 4A:
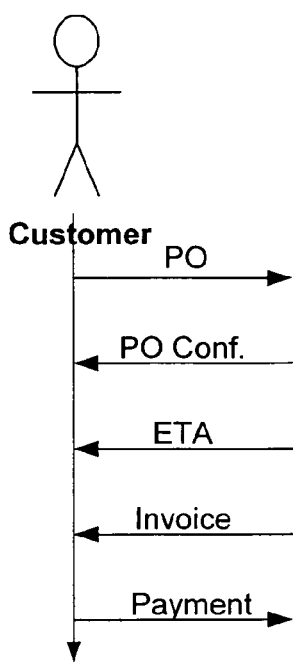
FIGS. 4a-4d illustrate the steps taken to implement the methodology of modeling a simple customer in accordance with one aspect of the present invention.
Figure 4B:
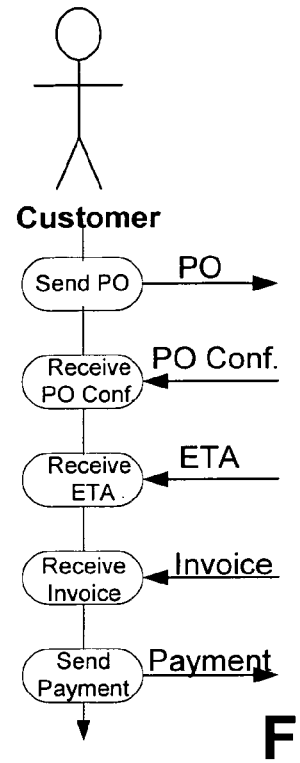
Figure 4C:
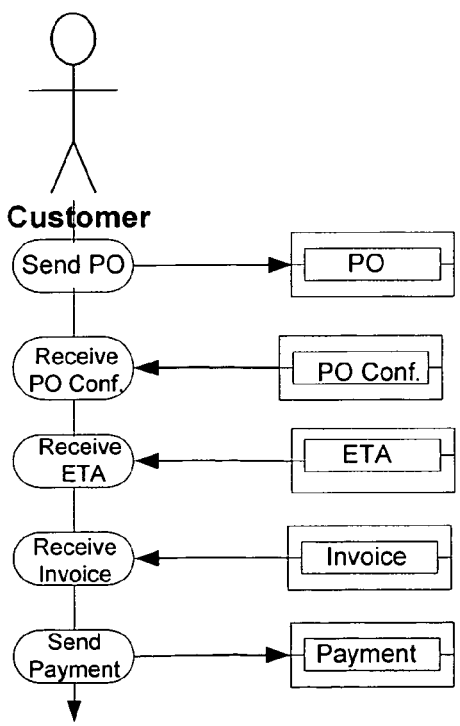
Figure 4D:
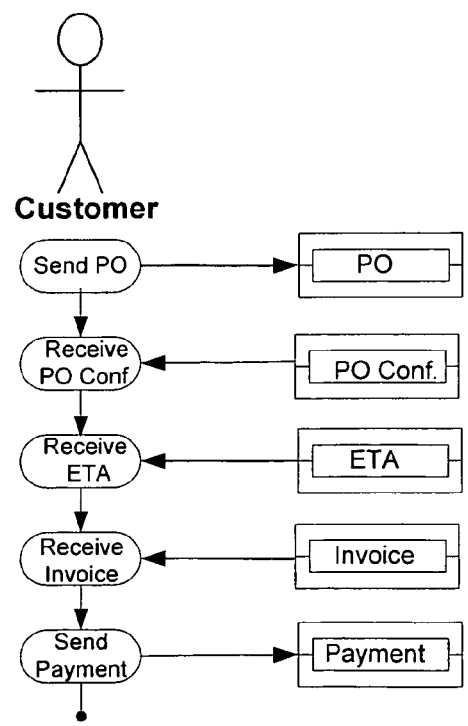
Figure 5:
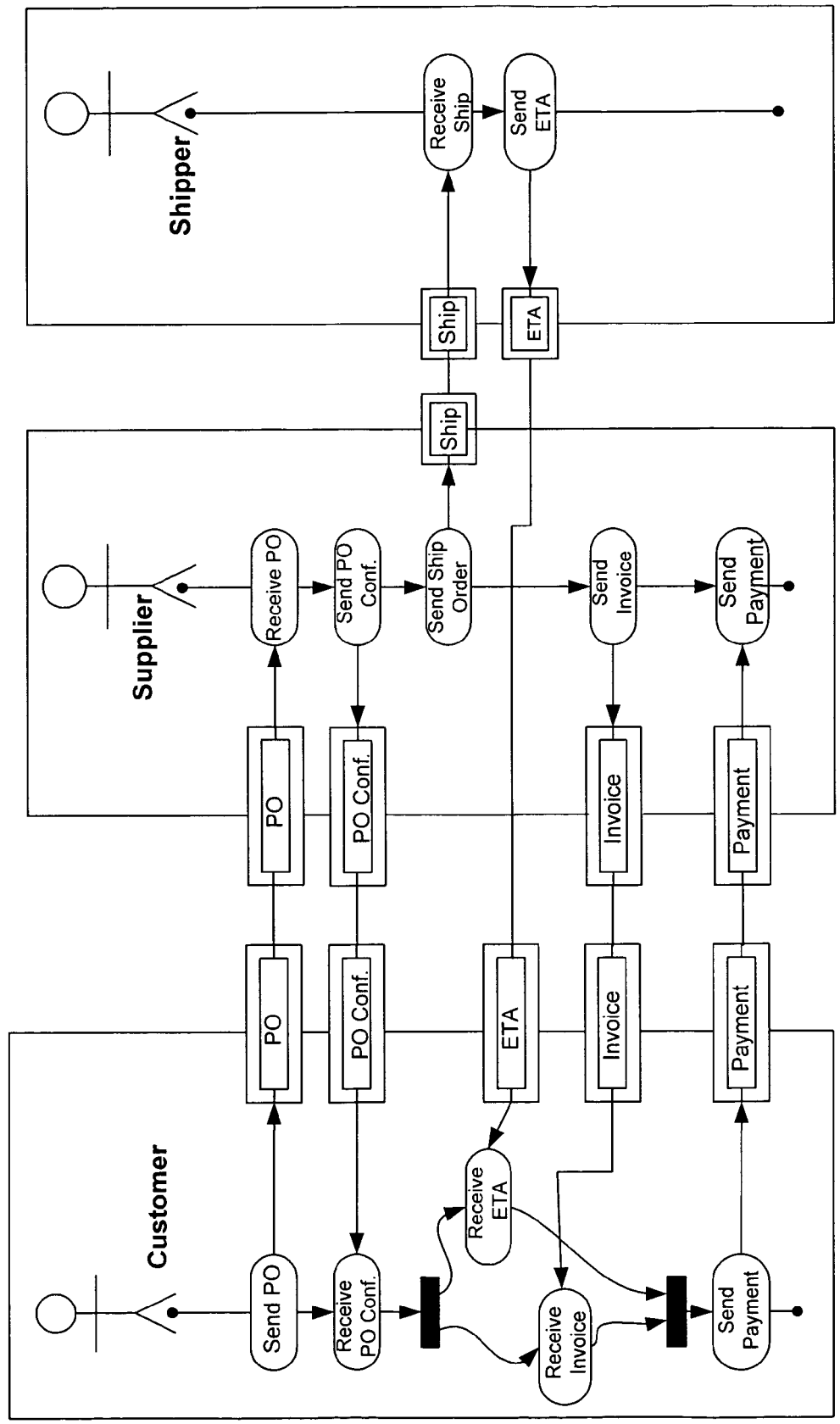
FIG. 5 illustrates a modeling interaction diagram of the simplified purchase interaction of FIG. 3 in accordance with one aspect of the present invention.

FIG. 3 illustrates a simple purchase interaction diagram in a system with autonomous interacting agents. The agents (e.g., customer, supplier and shipper) are autonomous in that their activities are concurrent and their lifetimes independent of one another. The interactions between the agents are manifested as exchanges of messages between each other (e.g., purchase orders, purchase order confirmations, ship order). The following example is centered on describing agents in terms of ordering of messages sent and received by the agents and modeling the entire system as a composition of individual agents. A completed purchase in which a product is received by the customer and the product paid for by the customer, represents a completed business workflow process. FIGS. 4a-4d illustrate treatment of the customer agent with respect to the programming language SLANG evolved from the business workflow model of the present invention. The atomic part of modeling utilizing the SLANG programming language is the description of elemental sending and receipt of messages referred to as actions (FIG. 4b). For each action, the SLANG programming language allows defining of the abstract location where a message is to be sent, known as a port, and from which port that the message is being received (FIG. 4c). Furthermore, the programming language SLANG allows a user to specify the ordering of individual actions in addition to whether those actions will be performed sequentially or concurrently (FIG. 4d). FIG. 5 illustrates the interaction between customer, supplier and shipper through messages sent and received by the ports. An example of concurrency is illustrated by the invoice receipt action and the ETA receipt action in the customer agent.

It is to be appreciated that the SLANG programming language allows the description of elaborate ordering of actions. Additionally, SLANG allows for the description of the composition between autonomous agents. However, the descriptions of the actions remain abstract in that each action is expressed only in terms of a port and a message. This abstraction allows for modeling of business workflow processes across various technologies by providing the binding in a separate routine that describes the concrete realization of actions onto the various technologies (e.g., a COM component, a database table).

FIG. 6 illustrates an example of the SLANG programming language syntax defined in Extended Backus-Naur Form (EBNF). The syntax includes schedule, ports, messages, contexts and process syntax. FIG. 7a illustrates schedule syntax in EBNF, while FIG. 7b illustrates schedule syntax in XML. A schedule first declares ports, messages and contexts and then describes an ordering of actions. An example of such a declaration is illustrated in FIG. 7c. FIG. 8a illustrates port syntax in EBNF, while FIG. 8b illustrates port syntax in XML. Ports are named abstract locations where messages are sent to and received from. Messages are named abstract data segments sent to and received from ports. Message syntax in EBNF is illustrated in FIG. 9a. Message syntax is illustrated in XML in FIG. 9b. Contexts are named escape points associated to some single action or process contained in a schedule. An attribute on a process or action referring to the context name effects the association to that context. A context is a label indicating where control is to be transferred when context is invoked (e.g., return). Optionally, a context can be a transaction indicating atomicity of the associated process or action. Additionally, an optional process form can accompany a transactional context to describe compensating behavior required to undo effects of the process action associated with the context. FIG. 10a illustrates context syntax in EBNF, while FIG. 10b illustrates context syntax in XML. Context allows the user to implement compensation tasks associated with transaction failures.

Figures 11A, 11B, 11C, 12:
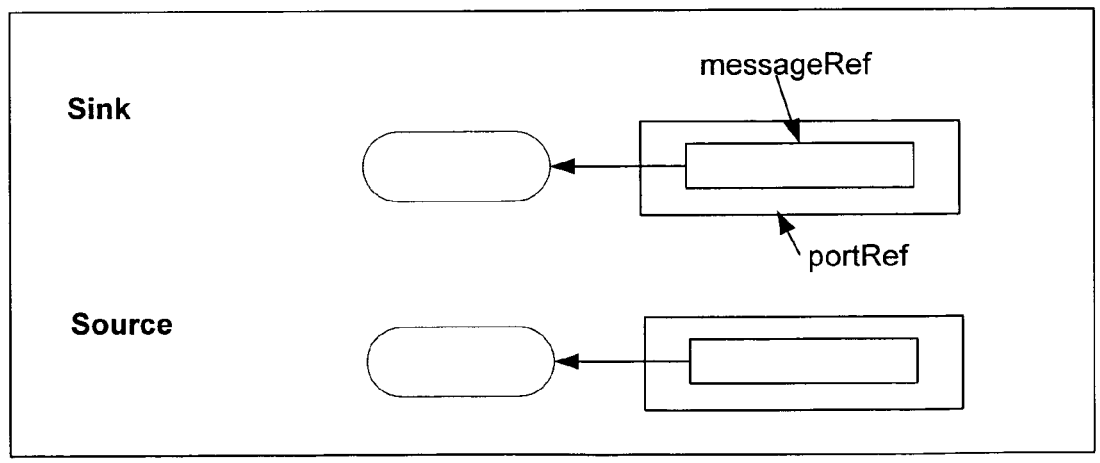
FIG. 11a illustrates an action construct in EBNF notation in accordance with one aspect of the present invention.
FIG. 11b illustrates an action construct in XML notation in accordance with one aspect of the present invention.
FIG. 11c illustrates a graphical image representing a sink and a source action construct in accordance with one aspect of the present invention.
FIG. 12 illustrates a process construct in EBNF notation in accordance with one aspect of the present invention.

The schedule body describes the process or flow of messages to ports. The basic element of a process is an action. The schedule body combines the action into more elaborate processes. An action can either be a sink, indicating that the schedule is to wait for messages to arrive at a port, or a source specifying a particular message to be sent to a port. An action completes once the message is delivered to the port. Action syntax in EBNF is illustrated in FIG. 11a. Action syntax is illustrated in XML in FIG. 11b. The optional contextref syntax refers to a named escape point that can be utilized at the action level for compensation upon failure of the action. A graphical user interface component for both sink and source actions is illustrated in FIG. 11c. The graphical user interface components can be implemented for providing users a simplified method of formulating models of business workflow processes. The graphical user interface components can then be converted to programmable SLANG syntax.

FIG. 12 illustrates in EBNF notation process construct syntax. Process constructs combine actions and processes into elaborate processes. FIG. 13a illustrates EBNF notation for a zero construct, while FIG. 13b illustrates the zero construct in XML. Zero indicates a process that does nothing. A graphical user interface component of a zero construct is illustrated in FIG. 13c.

Figures 14C, 14D, 15A, 15B:
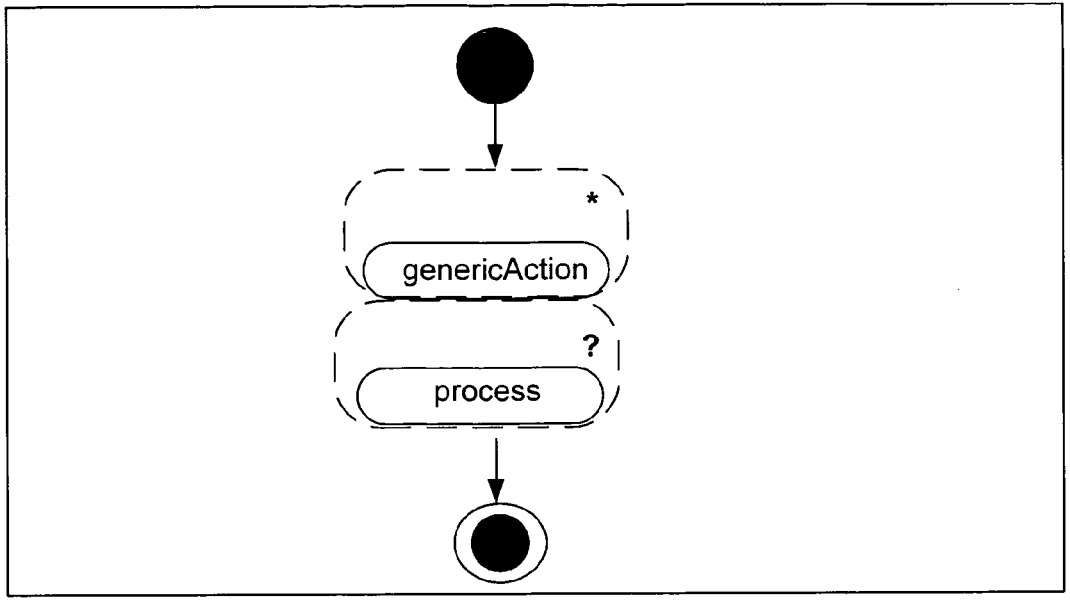
FIG. 14c illustrates a graphical image representing a sequence construct in accordance with one aspect of the present invention.
FIG. 14d illustrates implementation of a sequence construct in a schedule in accordance with one aspect of the present invention.
FIG. 15a illustrates a silence construct in EBNF notation in accordance with one aspect of the present invention.
FIG. 15b illustrates a silence construct in XML notation in accordance with one aspect of the present invention.

A sequence consists of a collection of generic actions that are executed serially. In addition to the basic actions source and sink, generic actions include silence, task, call, return and release. An optional process form concludes the sequence. A sequence completes when its last element (generic action or optional process) completes. FIG. 14a illustrates EBNF notation for a sequence constructor, while FIG. 14b illustrates the sequence constructor in XML. A graphical user interface component for a sequence constructor is illustrated in FIG. 14c. An example of a simple sequence is illustrated in FIG. 14d. The sequence operates sequentially with the sink action being performed and then the source action. Silence denotes a generic action that does nothing. FIG. 15a illustrates EBNF notation for a silence generic action, while FIG. 15b illustrates the silence generic action in XML.

Figures 16A, 16B, 16C, 16D:
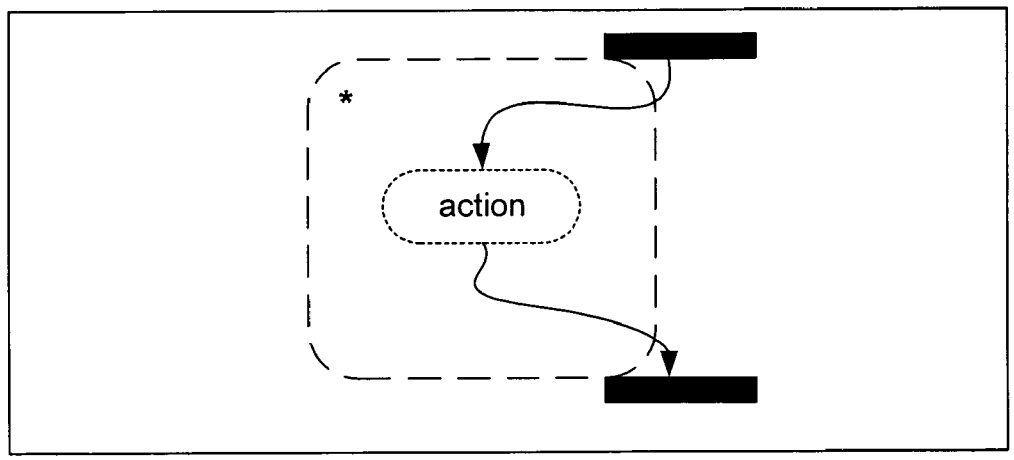
FIG. 16a illustrates a task construct in EBNF notation in accordance with one aspect of the present invention.
FIG. 16b illustrates a task construct in XML notation in accordance with one aspect of the present invention.
FIG. 16c illustrates a graphical image representing a task construct in accordance with one aspect of the present invention.
FIG. 16d illustrates implementation of a task construct in a schedule in accordance with one aspect of the present invention.

A task consists of a collection of independent concurrent actions (e.g. source or sink) that are executed in parallel. FIG. 16a illustrates EBNF notation for a task constructor, while FIG. 16b illustrates the task constructor in XML. A graphical user interface component is illustrated in FIG. 16c. An example of a simple task is illustrated in FIG. 16d. The task operates concurrently with both the source actions being performed in parallel. The task completes when all of the actions within the task complete. The task constructor allows the user to group actions and sequences, such that they execute concurrently.

A call represents the invocation of another schedule. FIG. 17a illustrates EBNF notation for a call constructor, while FIG. 17b illustrates the call constructor in XML. A call completes when the called schedule completes. A call mentions optional lists of ports and message names that are passed in as actual parameters to the called schedule. In the called schedule those ports and message references are positionally matched against that schedule ports and messages. The generic action return denotes an escape that effects a transfer of control to the named context. FIG. 18a illustrates EBNF notation for a return constructor, while FIG. 18b illustrates the return constructor in XML. Release indicates that the named context will not be invoked in the subsequent actions of the current process. FIG. 19a illustrates EBNF notation for a release constructor, while FIG. 19b illustrates the release constructor in XML. The call, return and release constructors allow users to implement compensations based on failed actions and transactions.

A switch constructor is provided specifying a list of possible branches in the control flow. Each branch consists of a case or an optional default. The cases are guarded by a test on a pair of messages. The control flow executes the process in the first case whose guard evaluates to true. The semantics of the test guarding a case is not specified in the programming language but the meaning of the test is elaborated in the schedule's binding. FIG. 20a illustrates EBNF notation for a switch constructor, while FIG. 20b illustrates the switch constructor in XML. A graphical user interface component representing the switch constructor is illustrated in FIG. 20c. An example of implementing the switch constructor in providing a loop function is illustrated in FIG. 20d. The loop is encapsulated in a schedule that is called from the main schedule with a switch testing for the loop invariant and a tail recursive call ending the loop body. When the "loopExample" schedule is called, the schedule will repeatedly wait for message m on port p until the match rule named by test evaluates to false when applied against the message pair m and mTrue.

A map construct is provided that runs a process within the scope of ports-to-messages mapping. FIG. 21a illustrates EBNF notation for a map construct, while FIG. 21b illustrates the map construct in XML. An example of implementing the map construct is provided in FIG. 21c. Each assignment in a map denotes that a message contains a reference to a port. In the process scoped by map, that port is the mapped to that message. A copy construct is provided that creates new instances of a process as needed. For example, a process is created if such creation would cause some action to occur, for example, when a message is delivered to the port corresponding to the first sink action of a copied schedule an instance of that schedule is created. FIG. 22a illustrates EBNF notation for a map construct, while FIG. 22b illustrates the map construct in XML.

A partition construct describes a collection of independent concurrent processes. The partition construct allows the users to represent transactions as autonomous independent transactions separate from concurrent interdependent transactions. In the present example, independent refers to the fact that each process in the partition refers to different ports, while concurrent meaning that all the processes in the partition proceed in parallel FIG. 23a illustrates EBNF notation for a partition construct, while FIG. 23b illustrates the partition construct in XML. A graphical user interface component representing a partition is illustrated in FIG. 23c. A connect construct allows for modeling a simple form of communication between processes. FIG. 24a illustrates EBNF notation for a connect construct, while FIG. 24b illustrates the connect construct in XML. A graphical user interface component representing a connect construct is illustrated in FIG. 24c. The connect construct allows the users to connect processes. For example, if a source action having a port p and a message m occurs in a connected process that is connected to a sink action having a port q and a message n, the message m from the source action will be received by the sink action as a message n.

Figures 26B, 27A:
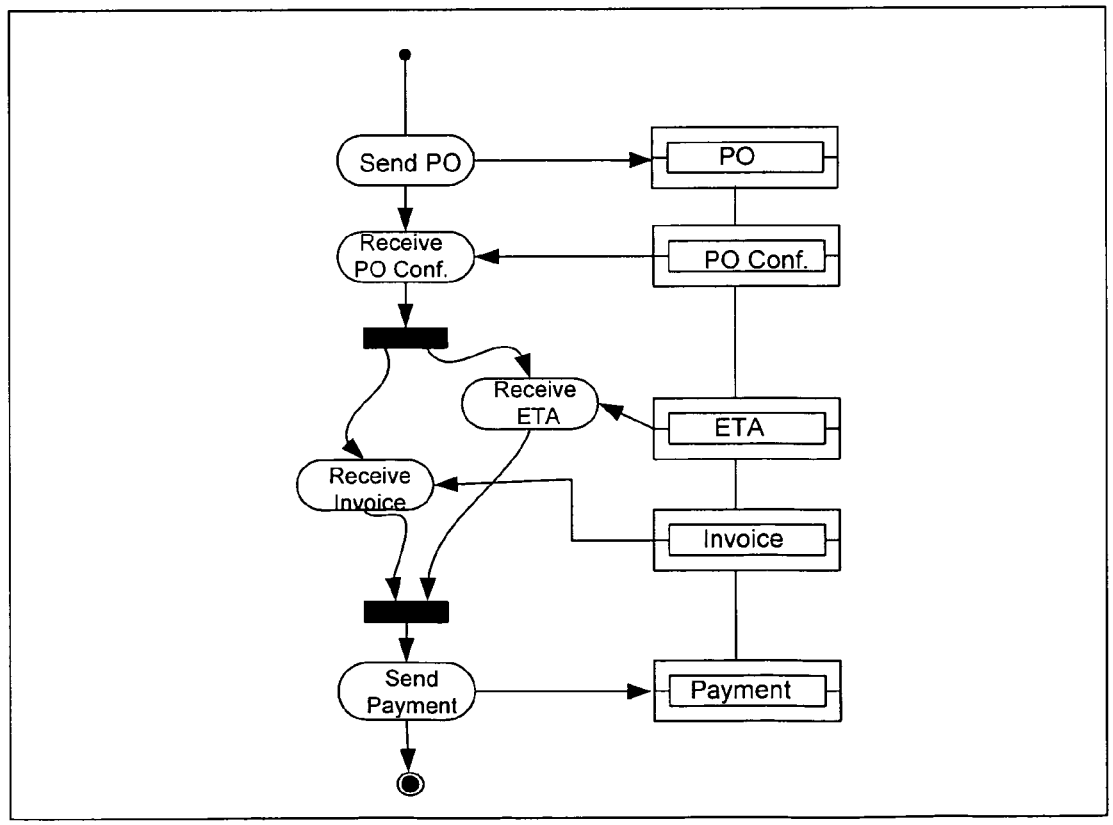
FIG. 26b illustrates an example of connecting ports using a connect expression in a schedule in accordance with one aspect of the present invention.
FIG. 27a illustrates a graphical representation of a customer business workflow process in accordance with one aspect of the present invention.

An alternate construct for providing communications among processes called a cut expression is provided. FIG. 25a illustrates EBNF notation for a cut construct, while FIG. 25b illustrates the cut construct in XML. The cut construct takes three processes as arguments and, itself, denotes a process. Three processes are, in order, a receiver, a sender, and a mediator. In most cases, the connect expression is adequate, which takes a receiver, a sender and a list of port pairs to connect. The connect construct implicitly creates a mediator from the port pair connection list. However, the more general cut expression is available for cases in with the mediator might be considered non-trivial. The purpose of the mediator is to connect ports between the sender and receiver. Without the availability of the cut construct, the sender and receiver must agree ahead of time not only on the names of the ports over which they communicate, but also make sure that those port names are in an isolated namespace, to ensure that they do not collide with ports in other processes. Cut relieves this burden on the communicating pair by placing it on a mediator. The mediator is little more than a list of ports that sender and receiver may share via shared binding constructions. For example, suppose a sender process was a source action with a port x and a message location w, and a receiver process was a sink action with a port x and a message location y, then a mediator process would be a sink action having a port u with a message location y. FIG. 26a illustrates the job of communicating message w to the receiver, via the private port u, so long as port z is bound in message y in all three processes. FIG. 26b illustrates an equivalent connect expression corresponding to the cut expression of FIG. 26a.

The above described syntax, formulated from the model of the present invention, allows for users to choose between conventional features of business workflow processes and model specific features in formulating custom models for the user's particular business workflow process. In particular, syntax is provided that allows users to explicitly separate autonomous independent business transactions from the interdependent concurrent business transactions, define transaction boundaries and thus improve granularity in the custom model. The syntax also allows a user to define compensating behavior as a result of failed transactions and synchronize concurrent interdependent actions and transactions based on completion of all the concurrent interdependent actions and transactions, respectively.

The syntax will now be described with reference to a simple customer-supplier example. FIGS. 27a-b illustrate a simple customer business workflow process. FIG. 27a illustrates the user graphical interface representing the business workflow process that may be formulated by the user, while FIG. 27b illustrates the corresponding schedule of the graphical interface containing SLANG syntax. The schedule name "customer" is declared in line 01. The header consists of lines 03-18 and includes portlist definitions (lines 04-10) and message list definitions (lines 11-17). The main body of the schedule is contained within lines 20-33 and begins with a sequence start tag and ends with a sequence end tag. As illustrated in the body, actions are performed sequentially within the sequence tags, except for actions within a task start tag and a task end tag, which are performed concurrently. The actions within the task tags represent the concurrent actions of the customer receiving an ETA message and an invoice message. The schedule will move to the next action (e.g., send payment) after the last message, of the concurrent actions, is received.

Figure 28A:
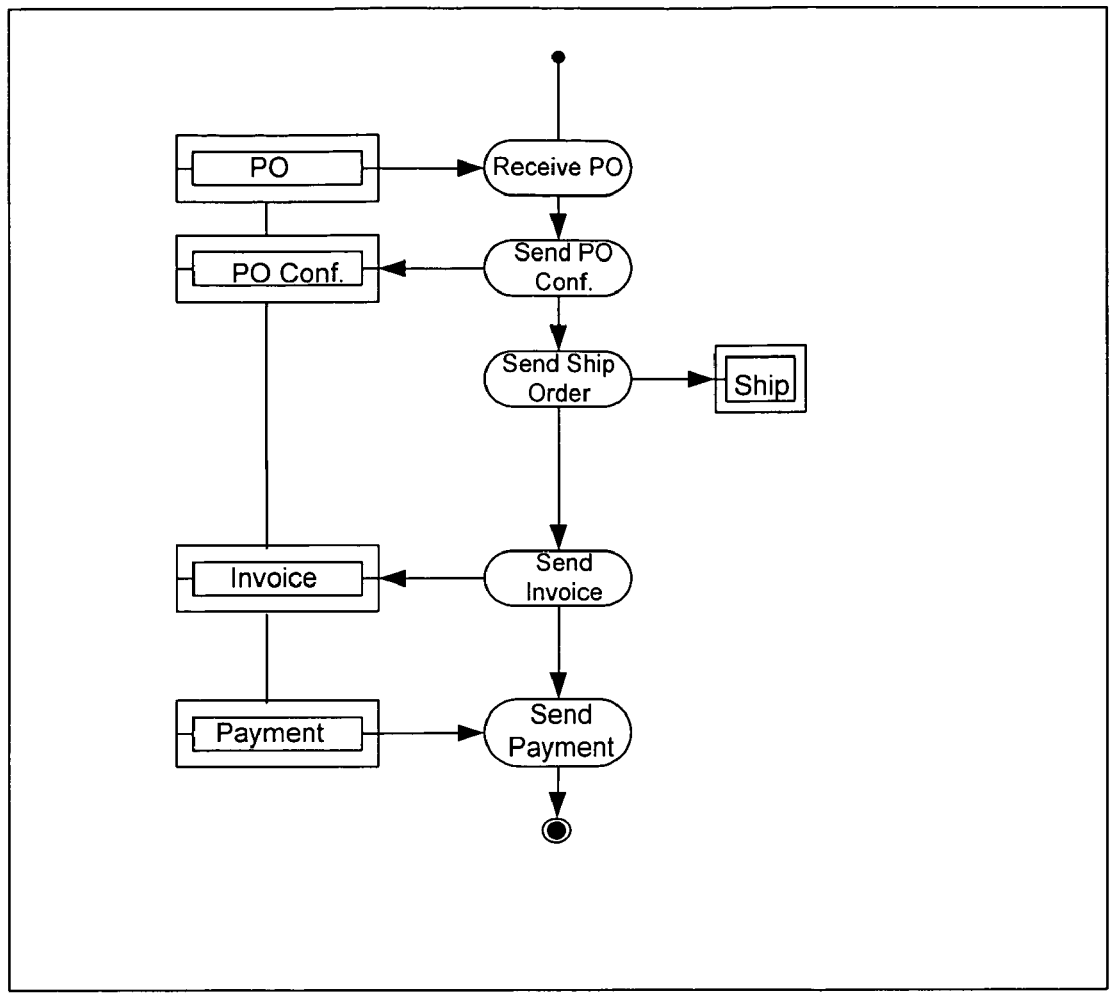
FIG. 28a illustrates a graphical representation of a supplier business workflow process in accordance with one aspect of the present invention.

FIGS. 28a-b illustrate a simple supplier business workflow process. FIG. 28a illustrates the user graphical interface representing the business workflow process that may be formulated by the user, while FIG. 28b illustrates the corresponding schedule of the graphical interface containing SLANG syntax. The schedule name "supplier" is declared in line 01. The header consists of lines 03-18 and includes portlist definitions (lines 04-10) and message list definitions (lines 11-17). The main body of the schedule is contained within lines 20-31 and begins with a sequence start tag and ends with a sequence end tag. As illustrated in the body, actions are performed sequentially within the sequence tags, which does not include any concurrent actions. FIGS. 29a-b illustrate a simple shipper business workflow process. FIG. 29a illustrates the user graphical interface representing the business workflow process associated with the shipper that may be formulated by the user, while FIG. 29b illustrates the corresponding schedule of the graphical interface containing SLANG syntax. The schedule name "shipper" is declared in line 01. The header consists of lines 03-12 and includes portlist definitions (lines 04-7) and message list definitions (lines 8-11). The main body of the schedule is contained within lines 14-19 and begins with a sequence start tag and ends with a sequence end tag. As illustrated in the body, actions are performed sequentially within the sequence tags.

Figure 30A:
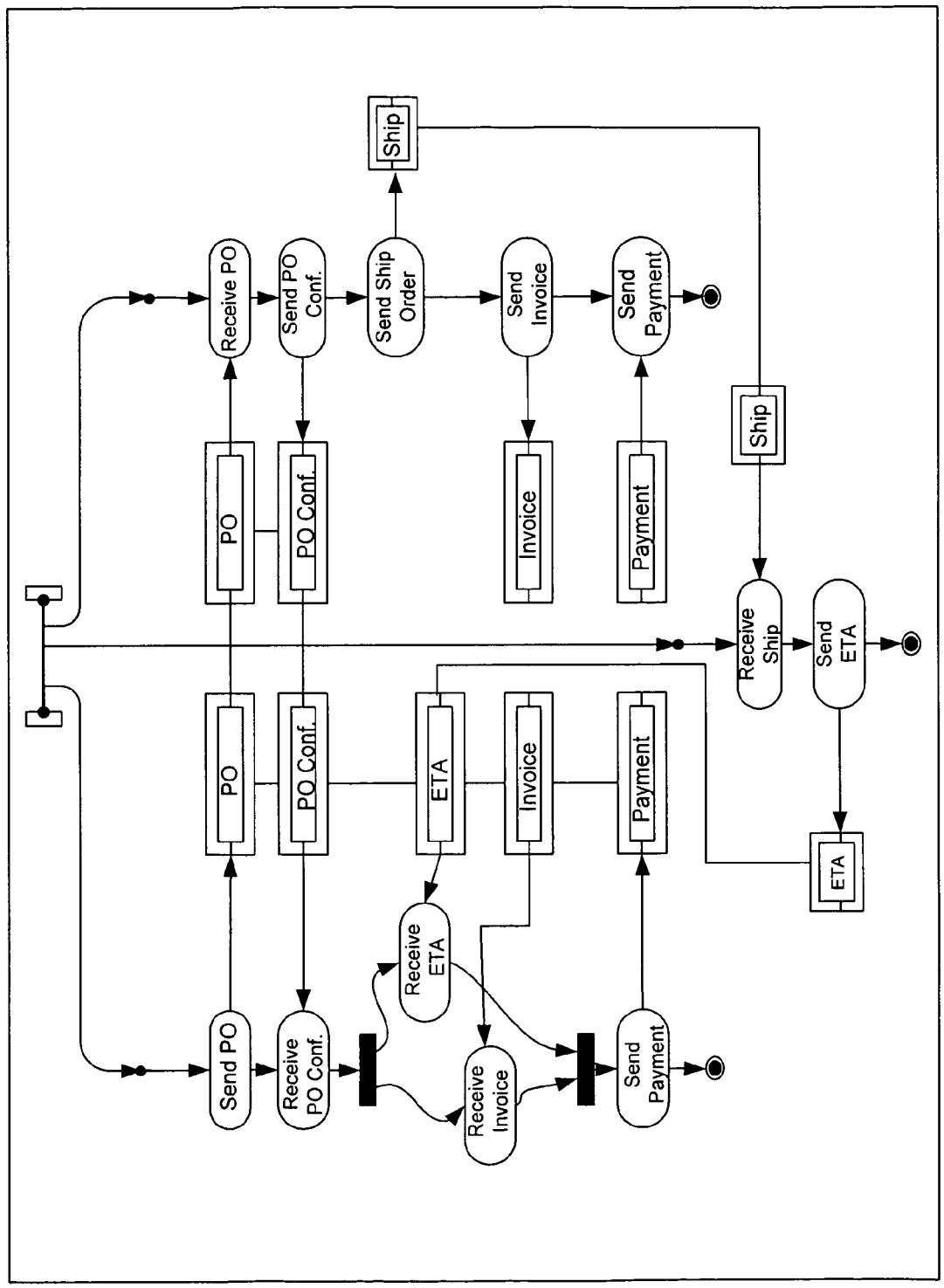
FIG. 30a illustrates a graphical representation of a combined business workflow process in accordance with one aspect of the present invention.

FIGS. 30*a-c* illustrate a combined customer supplier business workflow process. FIG. 30*a* illustrates the user graphical interface representing the business workflow process that may be formulated by the user, while FIGS. 30*b-c* illustrate the corresponding schedule of the graphical interface containing SLANG syntax. The schedule name "customerSupplier" is declared in line 01. The header consists of lines 03-18 and includes portname declarations. The main body of the schedule is contained within lines 20-60. A connection routine is provided in lines 29-47 for connecting the supplier schedule to the shipper schedule. A second connection routine is provided in lines 20-60 for connecting the customer schedule to the supplier and shipper connected schedule. This allows for the operations within the separate schedules to run concurrently, while providing communicating coupling between business operations of different entities.

It is to be appreciated that any programming methodology, process algebra and/or computer architecture suitable for carrying out the present invention may be employed and are intended to fall within the scope of the hereto appended claims.

The invention has been described with reference to the preferred embodiments. Obviously, modifications and alterations will occur to others upon reading and understanding the foregone detailed description. It is intended that the invention be construed as including all such modifications alterations, and equivalents thereof.

APPENDIX

SLANG DTD
<! ELEMENT schedule (header?, (zero | sequence | switch | map | copy | partition | connect | cut) ?, contextRef?)>
<! ATTLIST schedule
  name ID #IMPLIED
  guid CDATA #IMPLIED>
<! ELEMENT scheduleRef EMPTY>
<! ATTLIST scheduleRef
  location CDATA #REQUIRED>
<! ELEMENT header (portList?, messageList?, contextList?)>
<! ELEMENT portList (port*)>
<! ELEMENT port EMPTY>
<! ATTLIST port
  name ID #REQUIRED>
<! ELEMENT portRef EMPTY>
<! ATTLIST portRef
  location CDATA #REQUIRED>
<! ELEMENT messageList (message*)>
<! ELEMENT message EMPTY>
<! ATTLIST message
  name ID #REQUIRED>
<! ELEMENT messageRef EMPTY>
<! ATTLIST messageRef
  location CDATA #REQUIRED>
<! ELEMENT contextList (context*)>
<! ELEMENT context (transactional?)>
<![1] ATTLIST context
  name ID #REQUIRED>
<! ELEMENT transactional (zero | sequence | switch | map | copy | partition | connect | cut) ?>
<! ELEMENT contextRef EMPTY>
<! ATTLIST contextRef
  location CDATA #REQUIRED>
<! ELEMENT zero EMPTY>
<! ELEMENT sequence ((silence | sink | source | task | call | return | release)*, (zero | switch | map | copy | partition | connect | cut) ?, contextRef?)>
<! ELEMENT silence EMPTY>
<! ELEMENT sink (portRef, messageRef, contextRef?)>
<! ELEMENT source (portRef, messageRef, contextRef?)>
<! ELEMENT task ((sink | source)*, contextRef?)>
<! ATTLIST task
  choice (all | any) "all")
<!ELEMENT call (scheduleRef, portRef*, messageRef*, contextRef)>
<!ELEMENT return (contextRef?)>
<!ELEMENT release (contextRef?)>
<!ELEMENT switch (branch* default? contextRef?)>
<! ELEMENT branch (case, (zero | sequence | switch | map | copy | partition | connect | cut), contextRef?)>
<! ELEMENT case (ruleRef, messageRef, messageRef)>
<! ELEMENT ruleRef EMPTY>
<! ATTLIST ruleRef
  location CDATA #REQUIRED>
<! ELEMENT default ((zero | sequence | switch | map | copy | partition | connect | cut), contextRef?)>
<!ELEMENT map ((zero | sequence | switch | copy | partition | connect | cut), assignmentList?, contextRef?)>
<!ELEMENT assignmentList (assignment*)>
<! ELEMENT assignment (messageRef, portRef)>
<! ELEMENT copy ((zero| sequence | switch | map | copy | partition | connect | cut), contextRef?)>
<!ELEMENT partition ((zero | sequence | switch | map | copy | partition | connect | cut)*, contextRef?)>
<! ELEMENT connect ((zero | sequence | switch | map | copy | partition | connect | cut), (zero | sequence | switch | map | copy | partition | connect | cut), connectionList?, contextRef?)>
<! ELEMENT connectionlist (connection*)>
<! ELEMENT connection (portRef, portRef)>
<! ELEMENT cut ((zero | sequence | switch | map | copy | partition | connect | cut), (zero | sequence | switch | map | copy | partition | connect | cut), (zero | sequence | switch | map | copy | partition | connect | cut), contextRef?)>

What is claimed is:

1. A computer-implemented method for facilitating long-running transactions of a business workflow process, comprising:
  reducing a business process to a scheduling programming language written in XML;
  providing a user interface to allow a user to explicitly define a dividing of the reduced business process into at least one independent transaction and at least one parent transaction, the user explicitly defines the at least one independent transaction is not interdependent with the at least one parent transaction, the user explicitly defines the at least one parent transaction has two or more child interdependent transactions that are each different from each other and interdependent with each other, the user explicitly defines each child transaction receiving data from the at least one parent transaction that is at least partially different from data received by the other child transactions, the user explicitly defines the child transactions are children of the parent transaction, wherein at least one of the child interdependent transactions is dependent on at least one other of the child interdependent transactions for completion;

executing the at least one independent transaction independently from the at least one parent transaction to increase throughput and decrease latency of the business process, the at least one independent transaction commits upon successful execution;

executing the child interdependent transactions independently from each other, the at least one parent interdependent transaction commits after all child interdependent transactions have committed; and transferring committed data associated with the at least one independent transaction and the at least one parent transaction to a computer component for further processing.

2. The method of claim 1, the child interdependent transactions respectively include one or more actions, the one or more actions are concurrently executed independently from each other.

3. The method of claim 2, respective child interdependent transactions commit when all of their associated actions are completed.

4. The method of claim 1, further comprising explicitly defining transaction boundaries for the at least one independent transaction and the child interdependent transactions as a function of a number of actions within the at least one independent transaction and the child interdependent transactions, respectively, in order to define a granularity at an action level.

5. The method of claim 1, the child interdependent transactions are concurrently executed in isolation from each other.

6. The method of claim 1, further comprising employing separate machines to execute the at least one independent transaction and the at least one parent transaction.

7. The method of claim 1, further comprising failing the at least one parent transaction when at least one of its child interdependent transactions does not commit, and compensating the at least one failed child interdependent transaction.

8. The method of claim 7, the at least one parent transaction invokes a compensation routine within the at least one failed child interdependent transaction that compensates the at least one failed child interdependent transaction.

9. The method of claim 1, further comprising compensating the at least one independent transaction when at least one of the child interdependent transactions does not commit.

10. The method of claim 1, further comprising compensating the at least one parent transaction when it does not commit and all of its child interdependent transactions commit.

11. The method of claim 10, the at least one parent transaction invokes its own compensation routine.

12. A system that uses a scheduling programming language written in XML for facilitating implementation of business processes within a computer-readable medium, the components comprising:

a user interface component; and a plurality of model components accessible through the user interface component, the plurality of model components allows a user to create a model of a business process and reduce the model via the scheduling programming language, the plurality of model components comprises a distinguishing model component that distinguishes between autonomous business operations and interdependent business operations, the autonomous business operations are not dependent on each other for completion and are concurrent with respect to each other, the interdependent business operations are dependent on each other for completion and are concurrent with respect to each other, the interdependent business operations being non-identical and each receiving data from a preceding operation that is at least partially different from each other.

13. The system of claim 12, further comprising a transaction grouping component that groups business operations into interdependent business operations.

14. The system of claim 13, the transaction grouping component provides synchronization of interdependent business operations based on completion of the interdependent business operations.

15. The system of claim 12, further comprising an action grouping component that groups business operations into interdependent business operations.

16. The system of claim 15, the action grouping component provides synchronization of interdependent business operations based on completion of the interdependent business operations.

17. The system of claim 12, the plurality of components further comprising at least one boundary establishing component that defines transaction boundaries.

18. The system of claim 17, the at least one boundary establishing component includes a component that establishes concurrent operations.

19. The system of claim 18, the computer readable medium resides on a computer system.

20. The system of claim 17, the at least one boundary establishing component includes a component for establishing sequential operations.

21. The system of claim 17, further comprising a compensation component that compensates committed interdependent business operations and is invoked upon the occurrence of a failed interdependent business operations.

22. The system of claim 21, the interdependent business operations are children operations in a parent operation, wherein the compensation component is invoked by the parent operation.

23. The system of claim 21, the compensation component calls compensation routines within the committed interdependent business operations.

24. The system of claim 21, the compensation component calls compensation routines within the failed interdependent business operations.

25. The system of claim 24, the compensation routines utilize information within the committed interdependent business operations.

26. The system of claim 21, the compensation component calls compensation routines within the failed interdependent business operations based on information on the committed interdependent business operations stored within a database.

27. The system of claim 12, the plurality of components further comprising a component that defines concurrent synchronizing constraints as occurring upon completion of the autonomous operations.

28. A system that uses a scheduling programming language for representing business operations, comprising:

means for distinguishing between synchronization of autonomous operations from interdependent operations, the autonomous operations are not dependent on each other for completion and are concurrent with respect to each other, the interdependent operations are dependent on each other for completion and are concurrent with respect to each other, the autonomous operations and the interdependent operations are represented in the scheduling programming language, the scheduling programming language written in XML, the interdependent operations—each receive data from a preceding operation that is at least partially dissimilar with respect to data received by each interdependent operation;

means for expressing synchronization constraints on completion of autonomous operations; and means for allowing association of transaction operations and groups of business operations.

* * * * *